US011705856B2

(12) United States Patent
Anderson

(10) Patent No.: US 11,705,856 B2
(45) Date of Patent: *Jul. 18, 2023

(54) SOLAR AND/OR WIND POWERED ASSEMBLY

(71) Applicant: Lawrence E Anderson, Falls Church, VA (US)

(72) Inventor: Lawrence E Anderson, Falls Church, VA (US)

( * ) Notice: Subject to any disclaimer, the term of this patent is extended or adjusted under 35 U.S.C. 154(b) by 976 days.

This patent is subject to a terminal disclaimer.

(21) Appl. No.: 16/431,704

(22) Filed: Jun. 4, 2019

(65) Prior Publication Data

US 2020/0389123 A1 Dec. 10, 2020

(51) Int. Cl.
*H02S 20/32* (2014.01)
*F21L 4/08* (2006.01)
*H02S 40/34* (2014.01)
*H02S 40/38* (2014.01)
*F21Y 115/10* (2016.01)

(52) U.S. Cl.
CPC ............... *H02S 20/32* (2014.12); *F21L 4/08* (2013.01); *H02S 40/34* (2014.12); *H02S 40/38* (2014.12); *F21Y 2115/10* (2016.08)

(58) Field of Classification Search
CPC .......... H02S 20/32; H02S 40/38; H02S 10/40; F21V 23/0464; F21S 9/037; F21S 9/026; F21S 9/043; Y02E 10/50; F03D 9/007; F03D 9/25; F03D 13/20; F03D 7/0208; F03D 7/06; F24S 90/00; Y02B 10/10; Y02B 10/70
See application file for complete search history.

(56) References Cited

U.S. PATENT DOCUMENTS 5,690,408 A * 11/1997 de la Pena ........... G02B 6/0006
362/558
7,045,702 B2 * 5/2006 Kashyap ................. H02S 10/10
290/55

(Continued)

FOREIGN PATENT DOCUMENTS

CN        2251630 Y  *  4/1997
CN      101387270 A  *  3/2009  ............. F03D 13/20
CN      101931257 A  *  12/2010

(Continued)

OTHER PUBLICATIONS

Espacenet translation of DE 20210727 U1 (Year: 2002).*

(Continued)

*Primary Examiner* — Omar Rojas Cadima

(57) ABSTRACT

An assembly comprising at least one electrical device; the at least one electrical device being mounted to at least one support; at least one solar element for creating electric power from solar power; at least one energy storage device for storing electricity generated by the solar element; at least one wind impacting surface operatively associated with the support; at least one energy converter for generating electric power from the wind; and at least one shaft operatively connected to the at least one energy converter and the support. Optionally, the energy converter comprises at least one motor which operates to rotate the support; the at least one motor being operatively connected to the at least one battery for storing electric power therein.

19 Claims, 20 Drawing Sheets

(56) References Cited

U.S. PATENT DOCUMENTS 7,238,007 B2 * 7/2007 Wobben .................. F03D 17/00
　　　　　　　　　　　　　　　　　　　　416/61
7,789,524 B2 * 9/2010 Anderson .............. H05B 47/28
　　　　　　　　　　　　　　　　　　　　362/183

FOREIGN PATENT DOCUMENTS

| DE | 20210727 U1 * | 9/2002 | ........... F03D 7/0204 |
| JP | 2006291808 A * | 10/2006 | |
| KR | 100836269 B1 * | 11/2007 | |

OTHER PUBLICATIONS

"Bird death and wind turbines: a look at the evidence" by CarbonBrief, Apr. 2013 (https://www.carbonbrief.org/bird-death-and-wind-turbines-a-look-at-the-evidence/) (Year: 2013).*

* cited by examiner

FIGURE 12 PHOTO DIODE SUBASSEMBLY

FIGURE 13 PHOTO DIODE SUBASSEMBLY

FIGURE 14 PHOTO DIODE/LED SUBASSEMBLY

SOLAR AND/OR WIND POWERED ASSEMBLY

CROSS REFERENCE TO RELATED APPLICATIONS

This application is a continuation of U.S. application Ser. No. 15/457,888, entitled Solar or Wind Powered Assembly, filed Mar. 13, 2017, and issued Jun. 4, 2019, as U.S. patent application Ser. No. 10/309,597, to which priority is claimed, which is a continuation of U.S. application Ser. No. 14/223,992 entitled "Solar Or Wind Powered Assembly Device", filed Mar. 24, 2014, and issued Mar. 14, 2017 as U.S. Pat. No. 9,593,814, to which priority is claimed, which is a continuation of U.S. application Ser. No. 13/597,224 filed Aug. 28, 2012, entitled "Solar or Wind Powered Assembly," to which priority is claimed, which is a continuation of U.S. application Ser. No. 13/155,331, entitled "Photovoltaic Cell and LED Assembly and Method of Making" filed Jun. 7, 2011, now U.S. Pat. No. 8,251,535, to which priority is claimed which is a continuation of U.S. application Ser. No. 12/860,876 filed on Aug. 21, 2010, entitled "Electrical Assembly," now U.S. Pat. No. 7,954,977: to which priority is claimed, which in turn is a continuation of application Ser. No. 12/462,555 entitled "Solar or Wind Powered Light" filed on Aug. 5, 2009, now U.S. Pat. No. 7,789,524, to which priority is claimed. All of the above are incorporated by reference.

FIELD OF THE INVENTION

The present invention is directed to a solar powered light assembly and in particular to an economical and highly efficient LED lighting system.

BACKGROUND OF THE INVENTION

Conventional arguments concerning the feasibility of a natural powered electrical system often are thought of in terms of one type of power being selected over another. Hybrid and adaptable systems which adapt to changes in the weather, the type of climate, and the then current conditions are needed to fulfill the promise of a natural solution to energy needs.

U.S. patent application Ser. No. 12/025,737 entitled "SOLAR-POWERED LIGHT POLE AND LED LIGHT FIXTURE," hereby incorporated by reference, discloses a solar-powered lighting system that includes a flexible, wrap-around, preferably self-stick panel of photovoltaic laminate applied to the outside surface of a light pole. An LED light fixture is connected preferably at or near the top of the pole and has the same or similar diameter as the pole. The LED light fixture has multiple columns and rows of LEDs and an interior axial space for air flow to cool the LEDs. The pole preferably also has vents and axial passage(s) for creating a natural updraft through at least a portion of the pole and the light fixture, for cooling of the photovoltaic panel interior surface, the LEDs, and/or other equipment inside the fixture or pole, and batteries that may be provided inside the pole or pole base.

U.S. Patent Application No. 2006/0149607, hereby incorporated by reference, discloses means for programming and controlling an LED assembly using a programmable controller and feedback means.

SUMMARY OF THE PRESENT INVENTION

A preferred embodiment comprises an assembly comprising at least one energy consuming device; the at least one energy consuming device being mounted to at least one support; at least one element for creating electric power; at least one energy storage device for storing electricity generated by the element; at least one wind vane operatively associated with the at least one support; at least one energy converter for generating electric power from the at least one wind vane; at least one shaft operatively connected to the at least one energy converter and the at least one support. Optionally, the energy converter has a mode in which the energy converter operates to rotate the support; the at least one energy converter being operatively connected to the at least one battery for storing electric power therein. Optionally a programmable controller may be provided to control the assembly. Optionally a remote control may be utilized.

A preferred embodiment of the present invention comprises a solar powered LED in which the solar panels and LED substrate provide support for one another and are arranged in a manner which permits ease of assembly, facilitates cooling and is economical to fabricate which is adaptable to the environment and yet efficient and cost effective. A preferred embodiment of the present invention comprises methodology for utilizing a combined source of wind, solar and/or alternative energy which is adaptable both to the surrounding environment, weather and time of day considerations. In accordance with the principles of the present invention, the preferred embodiment is economic, cost effective, and easily maintainable. Optionally, a preferred embodiment having a combined solar and wind powered electric light (LED) assembly may include adjustable turbine mirrors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 5A illustrates optional vanes 6A which can be used to propel rotation of the support 3 and provide an additional cooling effect. Optionally, cover 5 may cover one half the circumference of vanes 6A so that the wind imparts only vanes turning in the direction of the wind. With the vanes placed in the proximity of the LEDs 3L, the cooling effect is enhanced.

DETAILED DESCRIPTION OF PREFERRED EMBODIMENTS

Figure 1:
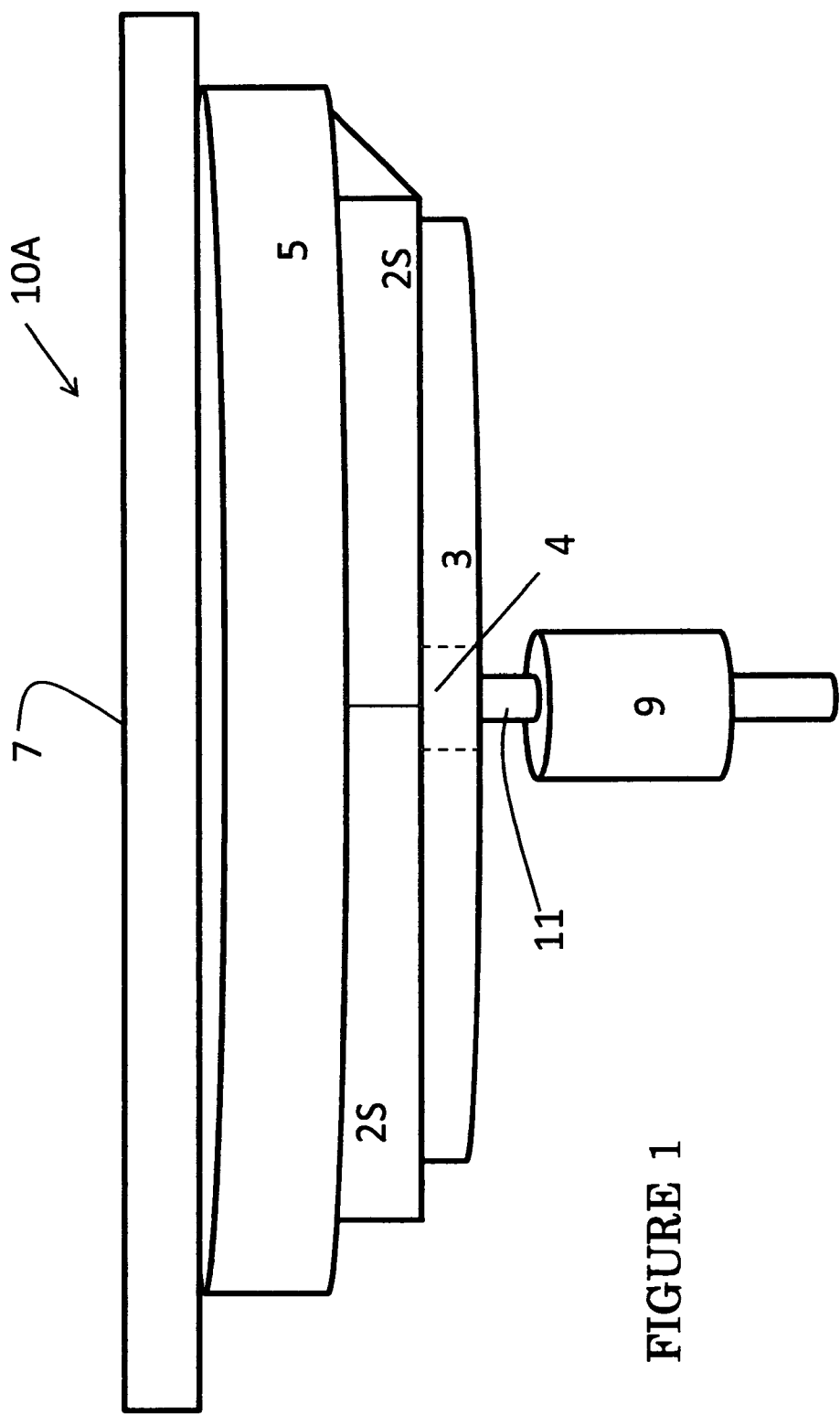
FIG. 1 is an illustration showing a side view of a preferred embodiment assembly 10A of the present invention comprising solar panels support 2, LED support 3, central portion 4, cover 5, wind direction detector 7, and motor/generator 9.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

In the description, a term "substrate" used herein may include a structure based on a semiconductor, having a semiconductor surface exposed. It should be understood that such a structure may contain silicon, silicon on insulator, silicon on sapphire, doped or undoped silicon, epitaxial layer supported by a semiconductor substrate, or another structure of a semiconductor. And, the semiconductor may be silicon, germanium, Indium gallium arsenide (InGaAs), or lead sulfide. InGaAs is a semiconductor composed of Indium gallium arsenic. Other combinations thereof, may not be used in combination but not limited to the above. In addition, the substrate described hereinafter may be one in which regions, conductive layers, insulation layers, their patterns, and/or junctions are formed.

As stated in Wikipedia, a photodiode is a type of photodetector capable of converting light into either current or voltage, depending upon the mode of operation. When used in zero bias or photovoltaic mode, the flow of photocurrent out of the device is restricted and a voltage builds up. The diode becomes forward biased and"dark current" (internally generated current) begins to flow across the junction in the direction opposite to the photocurrent. This mode is responsible for the photovoltaic effect which is the basis for solar cells.

As further stated in Wikipedia, in the photoconductive mode, the diode is often reversed biased dramatically reducing the response time at the expense of increased noise. This increases the width of the depletion layer, which decreases the junction's capacitance resulting in faster response times. The reverse bias induces only a small amount of current (known as saturation or back current) along its direction while the photocurrent remains virtually the same. The photocurrent is linearly proportional to the illuminance.

Figure 12:
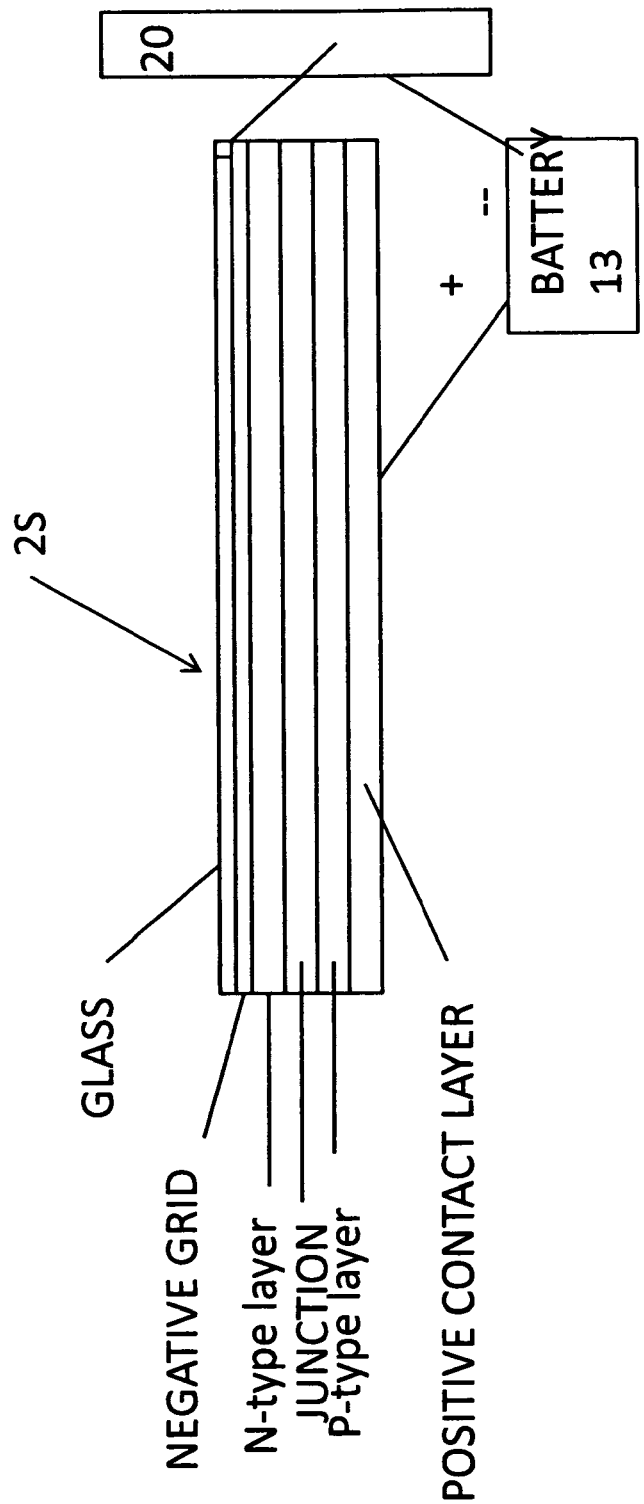
FIG. 12 is an illustration of an exemplary solar panel assembly comprising N-type and P-type semiconductor layers separated by a junction to form a solar diode assembly.

One facet of the invention, which is simply an option, is to build the LED and solar cell using a common substrate. In so doing, the device becomes more integral for stability and lighter for energy conservation. For example, shown in FIG. 12 are the semiconductor layers forming a photodiode. As reported in Science Daily, in an article titled "Advance Brings Low-cost, Bright LED Lighting Closer To Reality," Jul. 21, 2008, a new breakthrough in solid state lighting LED solid-state lights on regular metal-coated silicon wafers. Inside a reactor, gallium nitride is deposited on silicon at temperatures of about 1,000 degrees Celsius, or 1,800 degrees Fahrenheit. In the new silicon-based LED research, the Purdue engineers "metallized" the silicon substrate with a built-in reflective layer of zirconium nitride. Ordinarily, zirconium nitride is unstable in the presence of silicon, meaning it undergoes a chemical reaction that changes its properties. The Purdue researchers solved this problem by placing an insulating layer of aluminum nitride between the silicon substrate and the zirconium nitride.

FIG. 1 is a side view of a preferred embodiment of the present invention. The assembly shown in FIG. 1 is a preferred embodiment assembly 10 comprising solar panel support surface 2, LED support 3, central portion 4, cover 5, wind direction detector 7, and motor/generator 9. It can be readily appreciated by those of ordinary skill in the art that the solar support surface 2 may comprise one or a plurality of panels 2P and may take a variety of forms, such as circles, squares, rectangles or arcuate sections. The solar panels 2 may range in dimensions from 1 inch by one inch to two square feet depending on the application, power requirements, and resources available. The LED support 3 is shown as a "disk" but can be any configuration or form. LED support 3 supports LED 3L; which may be a plurality of up to 50 depending on the intensity desired. Moreover, the selection of LEDs 3L is exemplary and any type of light may be used without departing from the scope of the invention. The function of the solar support 2 and LED support 3 may be combined and a single support may perform both functions. Additionally, the solar support 2 and LED support 3 as well as solar diodes 2S and LEDs 3L may be one integral unit. Inasmuch as both LEDs 3L and photodiodes 2S comprise substrates, a preferred embodiment utilizes the same substrate for both the photodiode and LEDs. In this regard, the LEDs 3L may be formed using, for example, a sapphire substrate. The same substrate may be used for the photodiode configuration. By doing so, the assembly weight and material requirements are reduced. Moreover, an integral unit comprising the solar support 2 and LED support 3 provides for ease of assembly and greater strength and durability.

Assembly 10 further comprises vanes 6 mounted on the support 3. The vanes may be plastic or aluminum or any material which provides a light weight, durable, rigid construction. The vanes cause the support 3 to turn in response to the force of the wind. Wind screen 5 is substantially semicircular in configuration and shields one side of the LED support 3 while the other side is subjected to the wind. Wind screen 5 is rotatably mounted and is controlled by central vane 7 which responds to wind direction. In addition, LED support 3 is operatively attached to central portion 4 so as to rotate as motor/generator 9 turns, as will be described later.

Figure 2:
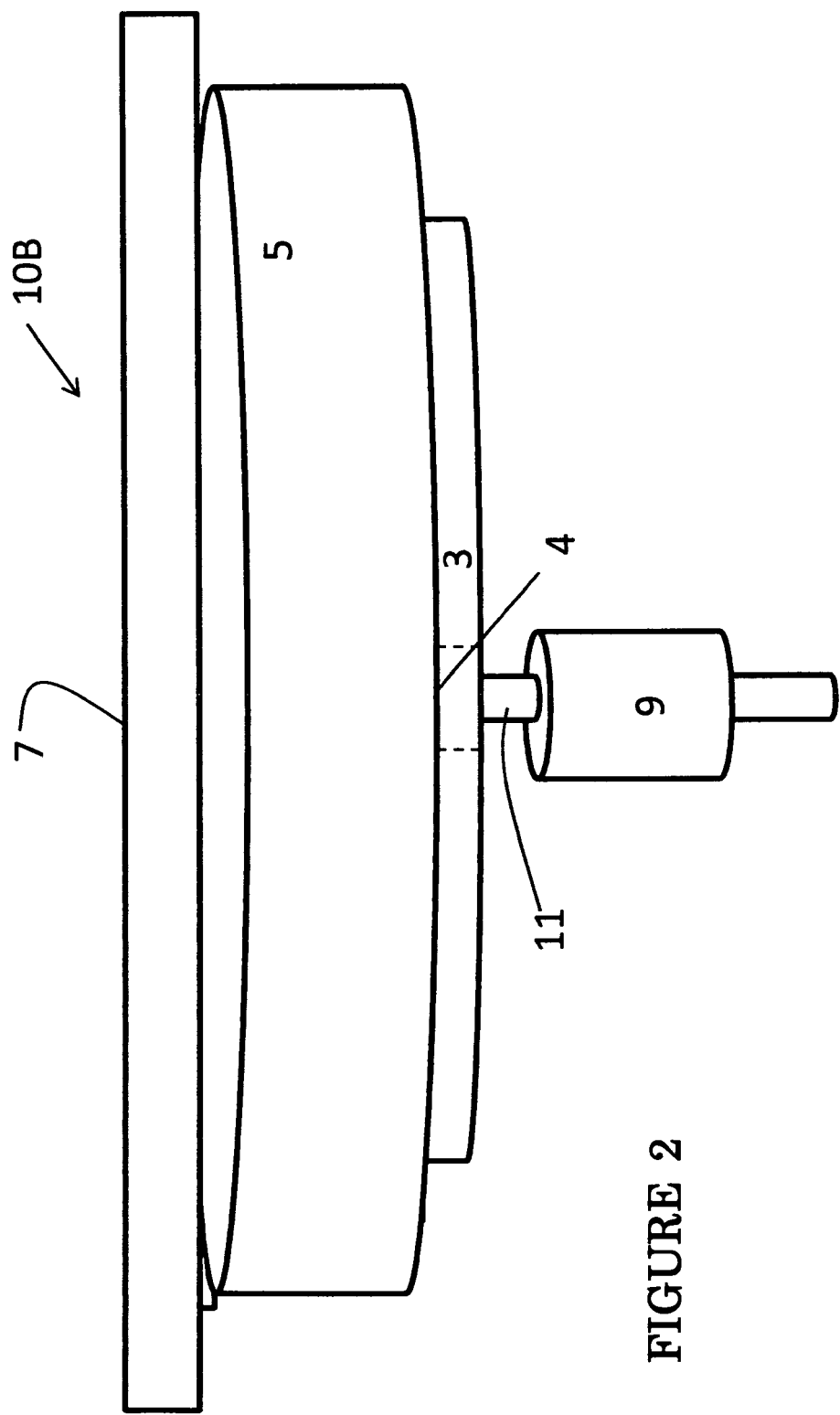
FIG. 2 is an illustration of another preferred embodiment assembly 10B wherein the vanes 6 are located between the solar support 2 and LED support 3 to increase cooling.

As shown in FIG. 2, the wind screen covers half of the vanes 6 so that the force applied by the wind to the vanes cases them to turn in a single direction. Other configurations which achieve this result are contemplated within the scope of the invention. The wind screen is substantially clear so as to allow the sun rays to penetrate to the solar panels 2.

Optionally the vanes 6 may be solar panels or mirrors that form the blades of the wind turbine. On the opposite side to solar panels 2S, LED support 3 may comprise additional vanes 6 which mirror or focus light from the LED support 3. In other words, mirrors operate to focus light onto solar panel as well as focus light onto subject area. Turning of turbine creates strobe effect to decrease light energy being used. The turbine blades 6 are optionally adjustable so that maximum wind speed does not damage generator/battery charger and/or structural supporting structure.

Figure 3:
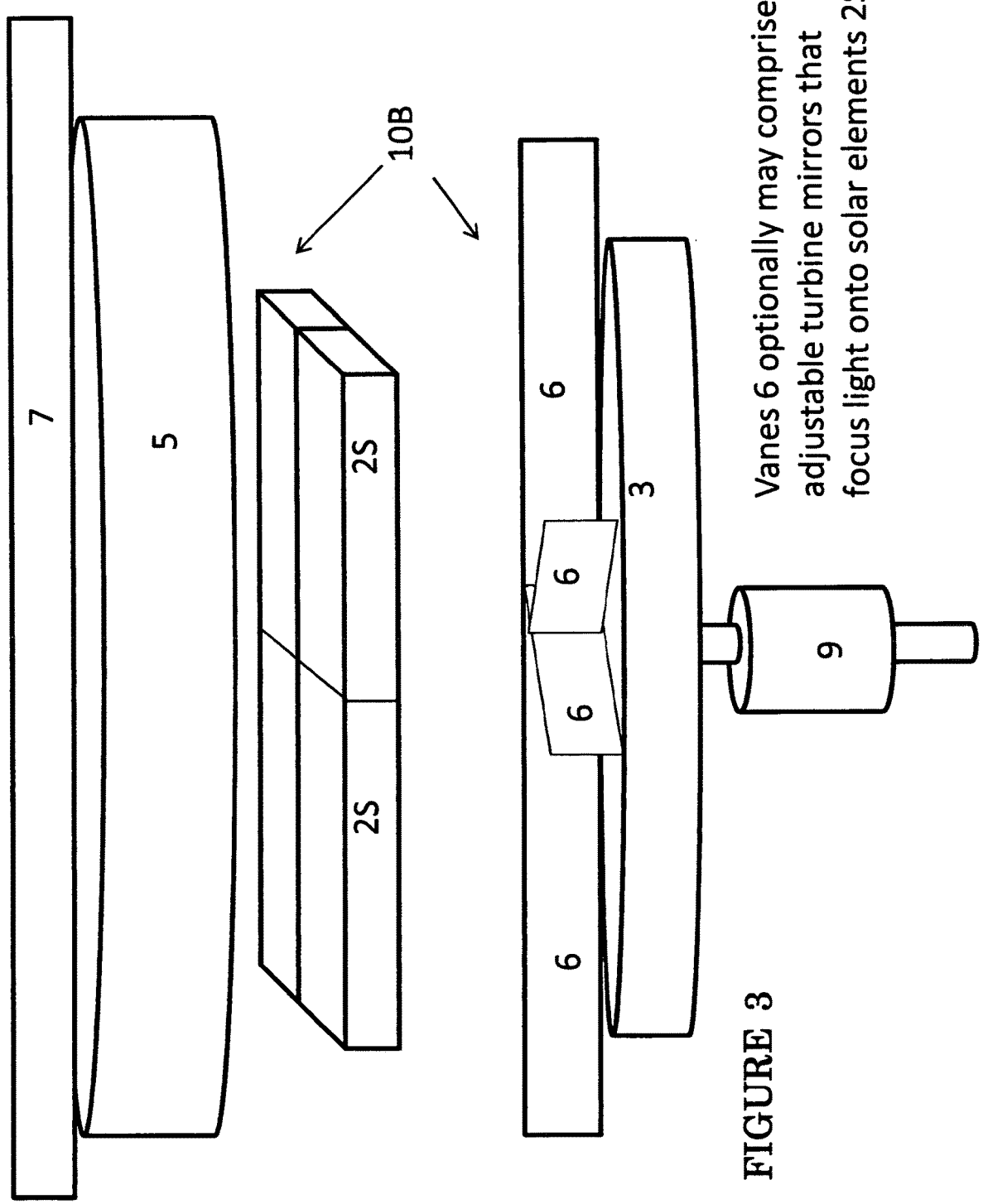
FIG. 3 is an illustration showing a cut-away view of the solar panels 2 and support 3, and vanes 6 of the preferred embodiment of the present invention shown in FIG. 2.

Shown in FIG. 3 is a preferred embodiment in which the vanes 6 are positioned between the solar panels 2 and LED support 3. This configuration effectively channels the wind between the solar panels 2 and LED structure. The wind dissipates the heat energy given off by the LEDs so as to facilitate cooling or temperature control. In the absence of wind, the vanes 6 may be turned by motor 9 to facilitate cooling. FIG. 3 further shows a side view of the LED support 3, photodiodes or solar panels 2, wind screen or cover 5 and wind directional vane 7, Wind directional vane 7 operates in a manner similar to a weather vane in that it points in the wind direction. Wind directional vane 7 may be a variety of configurations The directional vane 7 and wind screen form an integral unit and are designed so the weight is evenly distributed each side of the axis of rotation, but the pointer can move freely on its axis. The area of the directional vane 7 is distributed so that the side with the larger area is blown away from the wind direction. The optional directional pointer may be mounted such that is always on the smaller side. For the wind direction reading to be accurate, the directional vane must be located well above the ground and away from buildings, trees, and other objects which interfere with the true wind direction. But the same is not necessary for the basic functioning of the assembly 10.

Figure 4:
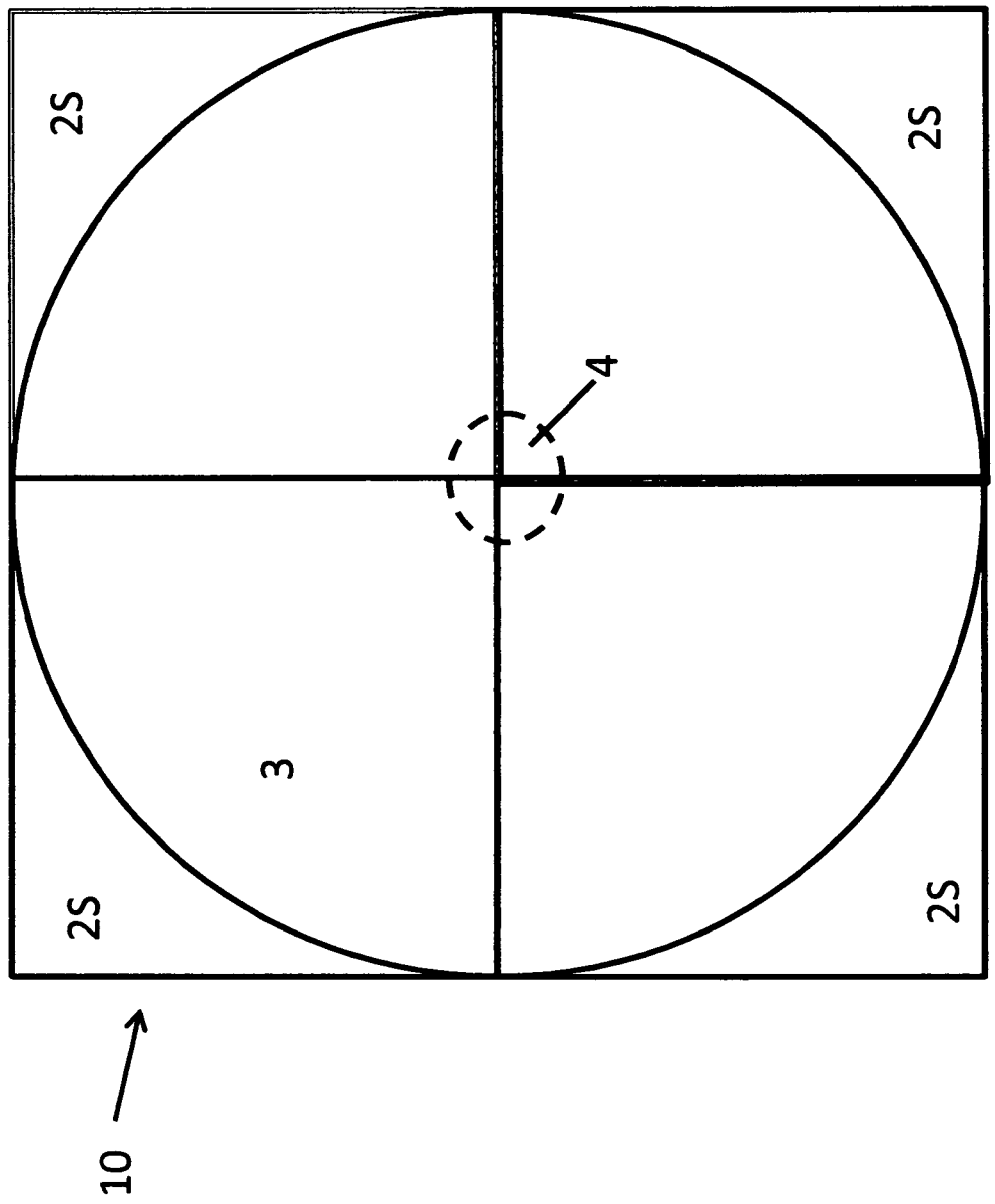
FIG. 4 is an overhead illustration of a cut-away view of support 3 and solar panels 2 showing a central portion 4 which provides a housing for a shaft for either rotation thereon or therewith.

Shown in FIG. 4 is a "see-through view" showing the overlay of the photodiode panels 2 vis-à-vis the LED support 3, and the central pivot or rotating shaft-like portion or housing 4. These elements are not intended to be transparent, but are shown as being transparent for illustrative purposes only. Although four panels 2 occupying quarter sections are shown in FIG. 4, any number of panels may be utilized. The panels may be shaped in the form of a rectangle, square, circle, arcuate segment or can be solid or contain holes for the passage of air.

Figure 5:
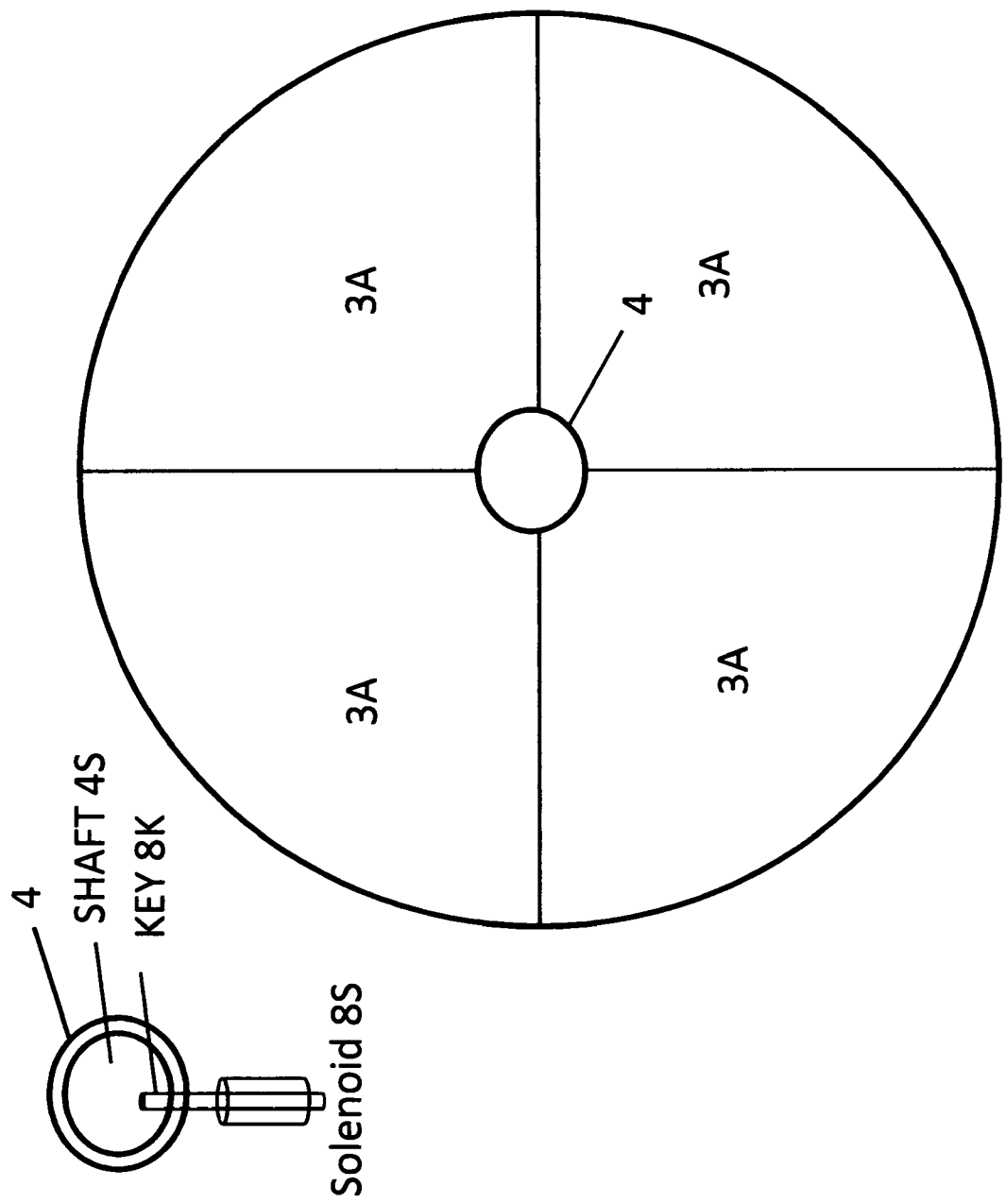
FIG. 5 is an overhead illustration of a cut-away view of support 3 and LED support panels 3A.

FIG. 5 illustrates the support 3 which can be rotatably attached to a central shaft. The LED segments 3A or blocks may be of any configuration and the four arcuate segments are but an example of a variety of possible configurations. LED modules which are commericially available may be placed on the LED support 3 in a conventional manner. FIG. 5 illustrates an optional shaft 4S, housing 4, key 8K and solenoid 8S. When solenoid 8S is energized, the central portion of the solenoid 8S engages the key 8K in the shaft 4S causing the shaft to turn with the support 3.

Figure 5A:
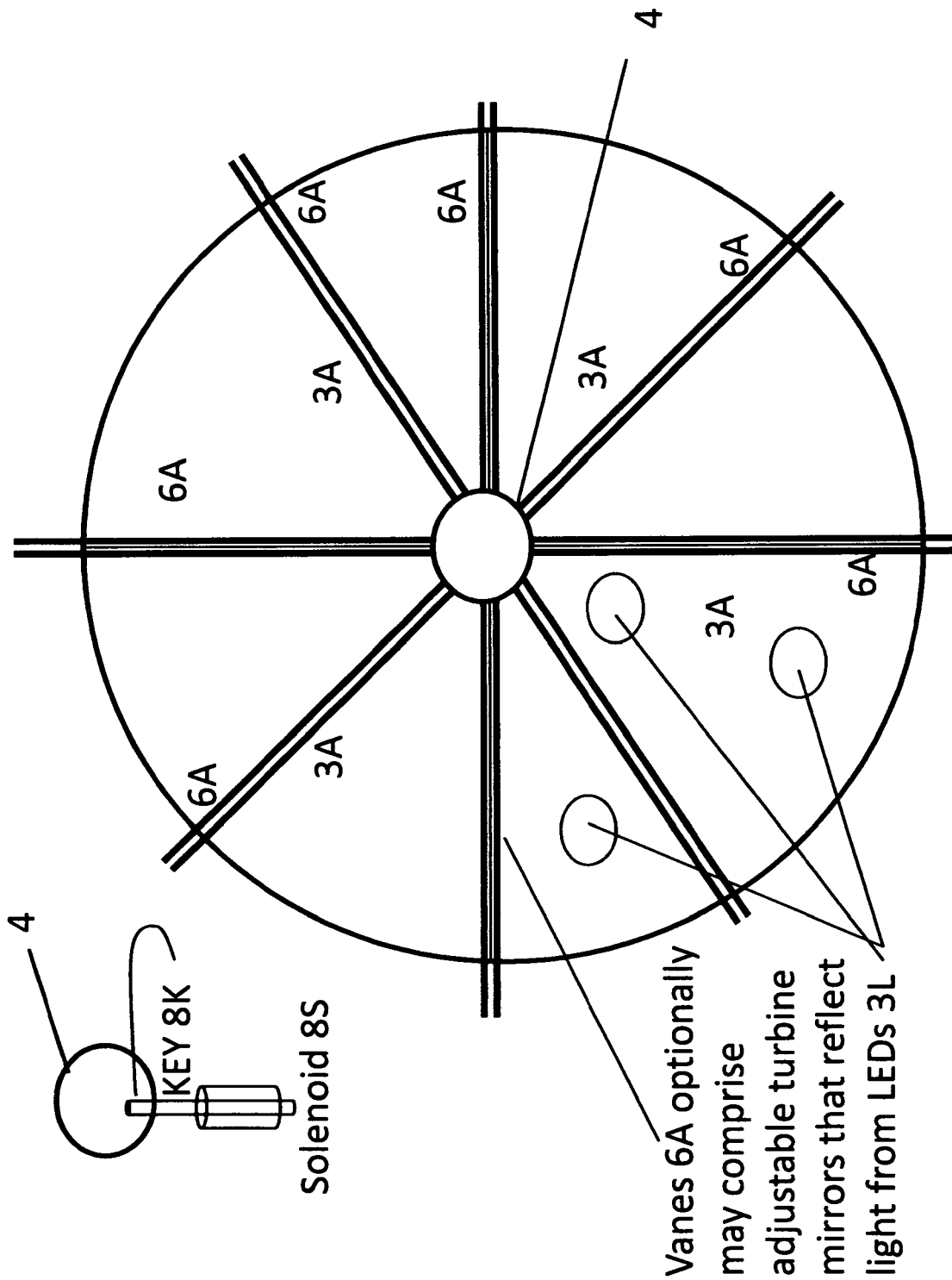
FIG. 5A is an overhead illustration of a cut-away view of support 3 including LED panels 3A.

FIG. 5A is an overhead illustration of a cut-away view of LED support 3 illustrating optional vanes 6A which can be used to propel rotation of the support 3 and provide an additional cooling effect. Optionally, cover 5 may cover one half the circumference of vanes 6A so that the wind imparts only vanes turning in the direction of the wind.

Figure 6:
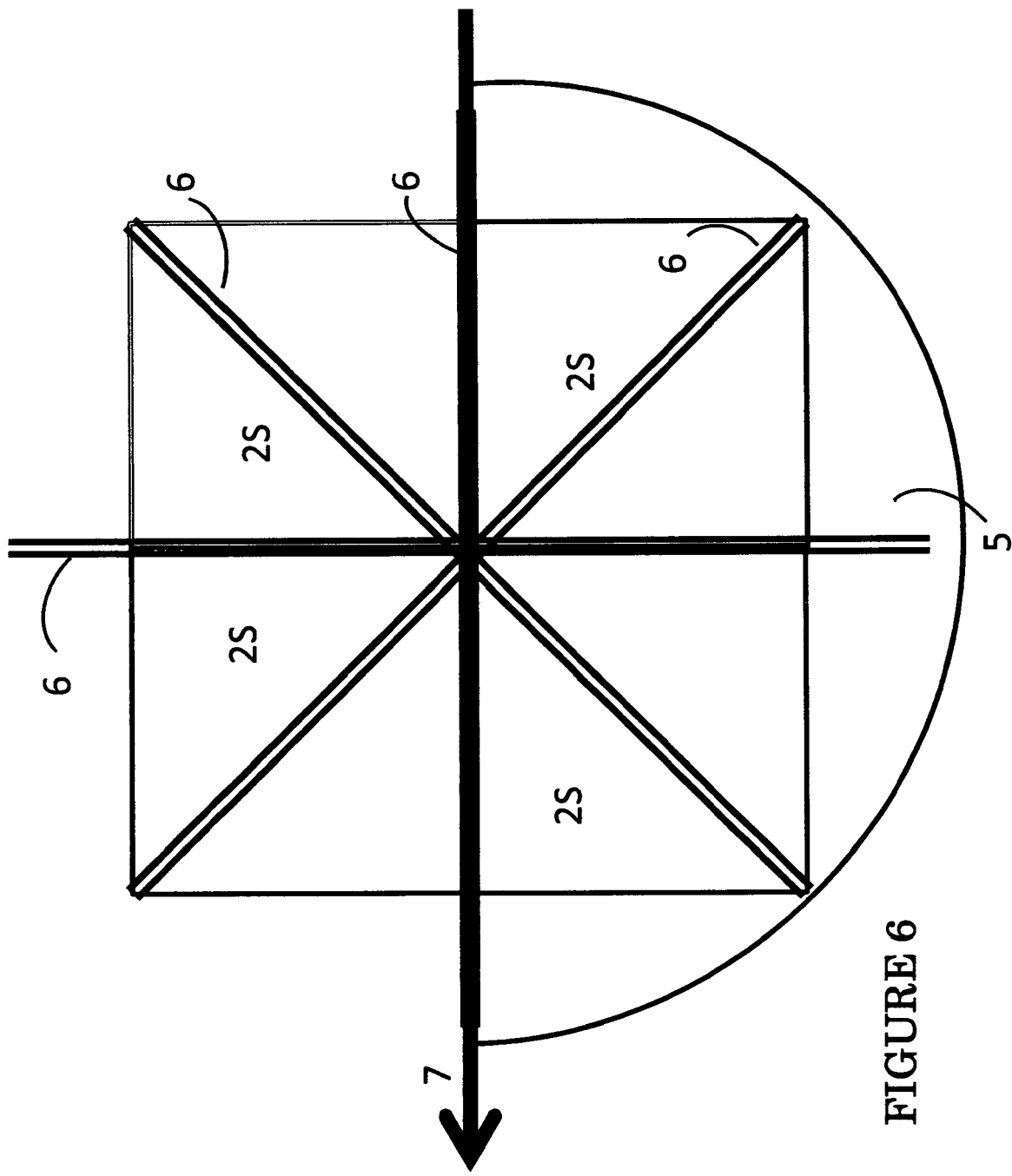
FIG. 6 is an illustration from an overhead perspective of the assembly of FIG. 1 showing the orientation of cover 5 responsive to a wind direction from the right to the left of the page.

Shown in FIG. 6 is a plan view of a preferred embodiment of the present invention. As shown in FIG. 6, for a prevailing wind direction from right to left (as shown in the Figure) the wind direction detector 7 would point to the left and the cover 5 would cover half of the vanes 6 so that the support 2 and the support 3 would turn in a counterclockwise direction on central portion 4. Central portion 4 may be a shaft which is operatively connected to shaft 11 and motor/generator 9. Although four vanes (or eight vane segments are shown in FIG. 6, any number of vanes could be used to enable the wind to propel or rotate the subassembly.

Figure 7:
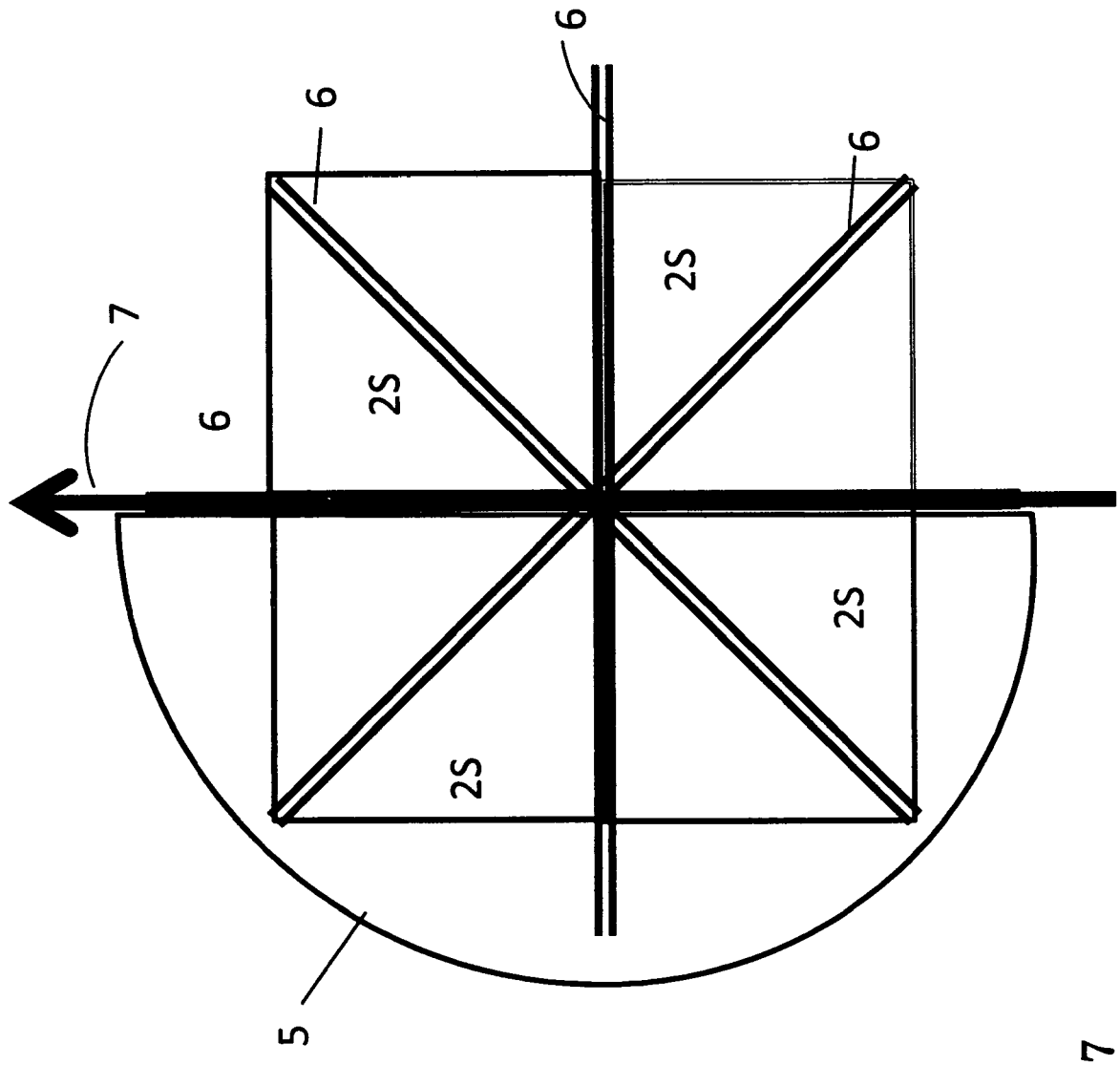
FIG. 7 is an illustration from an overhead perspective of the assembly of FIG. 1 showing the orientation of cover 5 responsive to a wind direction from the bottom to the top of the page.

Shown in FIG. 7 is a plan view of a preferred embodiment of the present invention. As shown in FIG. 7, for a prevailing wind direction from bottom to top (as shown in the Figure) the wind direction detector 7 would point to the top and the cover 5 would cover half of the vanes 6 so that the solar panels 2 and the LED support 3 would turn in a counterclockwise direction on central portion 4. Central portion 4 may be a shaft which is operatively connected to shaft 11 and motor/generator 9. Although four vanes (or eight vane segments are shown in FIG. 7, any number of vanes could be used to enable the wind to propel or rotate the subassembly.

Figure 8:
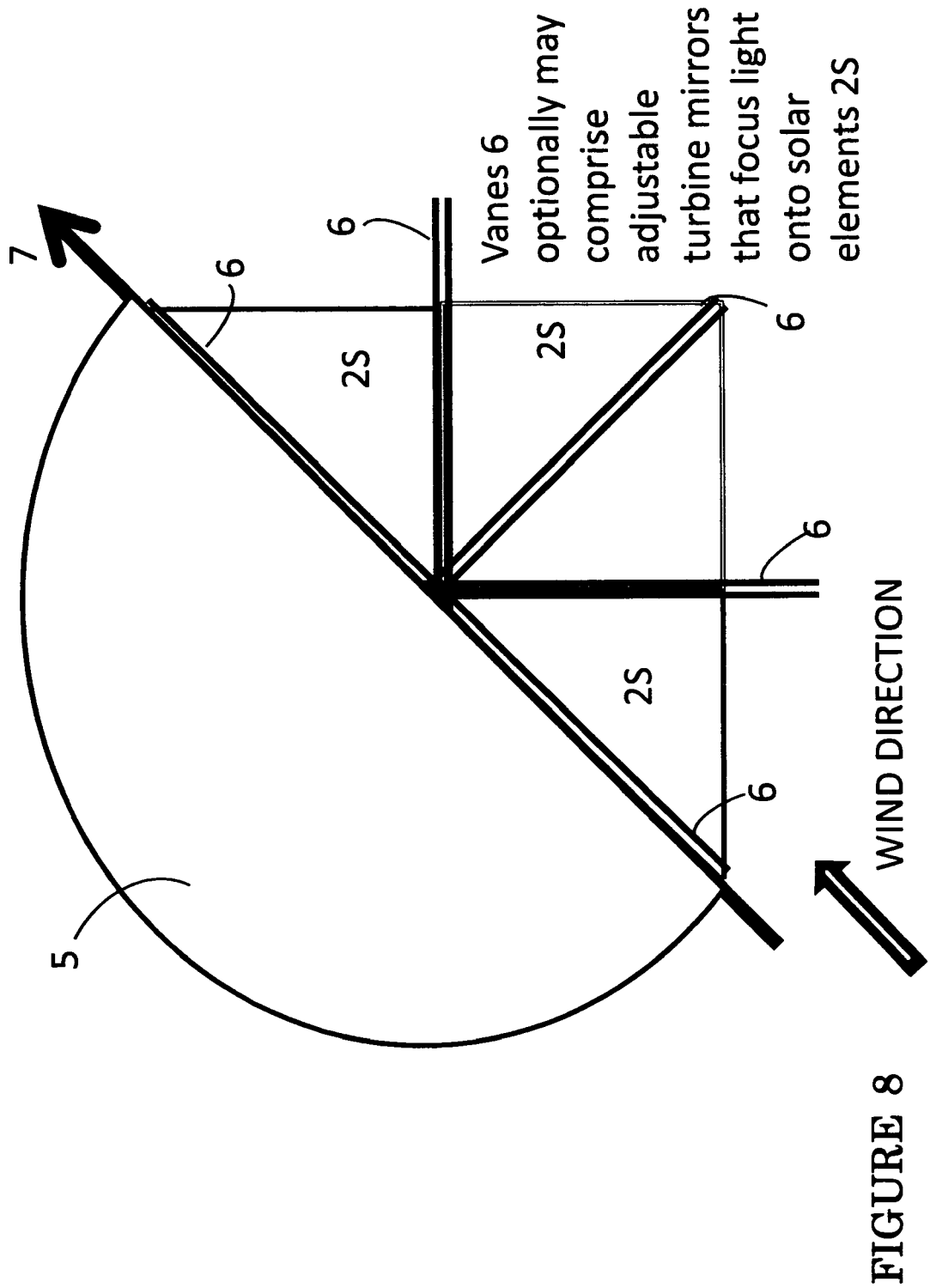
FIG. 8 is an illustration of from an overhead perspective of the assembly of FIG. 1 showing the orientation of cover 5 responsive to a wind direction from the bottom left to the top right of the page.

Shown in FIG. 8 is a plan view of a preferred embodiment of the present invention. As shown in FIG. 8, for a prevailing wind direction from bottom left to top right (as shown in the Figure) the wind direction detector 7 would point to the top right and the cover 5 would cover half of the vanes 6 so that the solar panels 2 and the support 3 would turn in a counterclockwise direction on central portion 4. Although the cover 5 is shown as solid and not transparent to like, the cover 5 may be transparent or translucent to allow passage of sunlight to panels 2.

Figure 9:
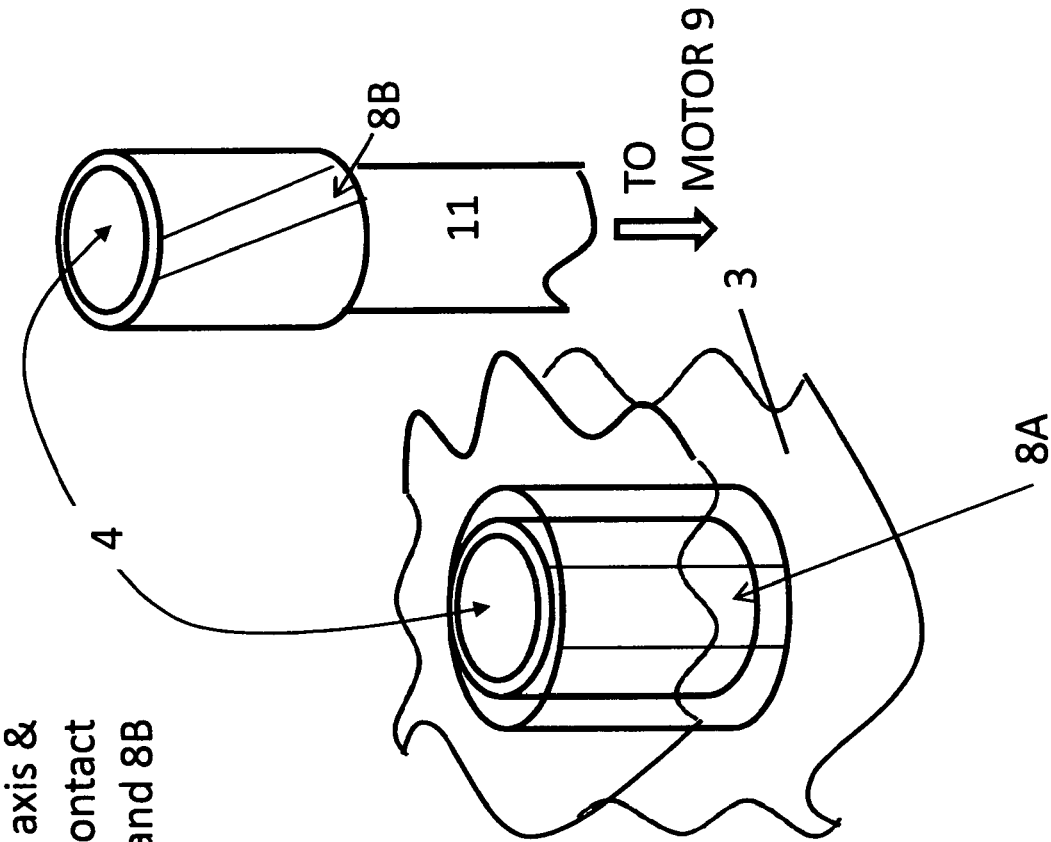
FIG. 9 is a diagrammatic illustration of the central portion 4 depicting the contacts which provide for intermittent or "strobe-like" effect for illumination of the LED to conserve power, blend different colors of light, and/or reduce heat.

Shown in FIG. 9 is a preferred embodiment subassembly that is an optional portion of the invention. The subassembly comprises a central portion 4 which is operatively connected to a shaft 11, which may be solid or hollow. Although only a portion of the support 3 is shown in FIG. 9, it can be appreciated that the support 3 extends outward from the portion shown in FIG. 9. In an optional embodiment, the shaft 11 has a first electrical contact which may be a metal such as copper, gold, silver or aluminum. As the support 3 turns on the shaft 11, a second electrical contact 8B makes intermittent electrical connection with the contact 8A. When powering the LEDs through this contact, a strobe-like effect is achieved when the LEDs are turned on and off as intermittent contact is made through the connection of contacts 8A and 8B. The contact portion 8B may be adjustable thought the expansion and contraction of the area of the contact 8B. This strobing effect conserves energy and creates a decorative effect. In an embodiment in which the battery level is monitored, when the battery reaches a low charge level, the assembly may automatically be switched to a mode in which the LEDs are flashed on and off in the strobe mode to conserve energy from the battery. Optionally, controller 21 may control the operation of contacts 8A, 8B and shaft 11.

Moreover, the shaft and support 3 may have an integral setting or mode in which the support 3 is substantially locked (such as for example by a solenoid 8S) so as to turn integrally with the shaft 11. This may be accomplished mechanically, such as by using a sliding pin, or remotely such as by using magnetism to lock the contacts 8A, 8B in place. When the contacts are locked into position freely relative to one another, in this mode, the contacts 8A and 8B remain in direct contact as the shaft 11 turns. Alternately, the shaft 11 may turn freely in one direction, yet be prevented from turning in another such as by a rachet-type system well known to those of ordinary skill in the art. Contacts 8A and 8B are merely examples of a strobe element which function may be perform by other means which cause power to the LEDs 3L to be intermittent. The strobe element may be controlled through the use of programmable controller 21.

Figure 10:
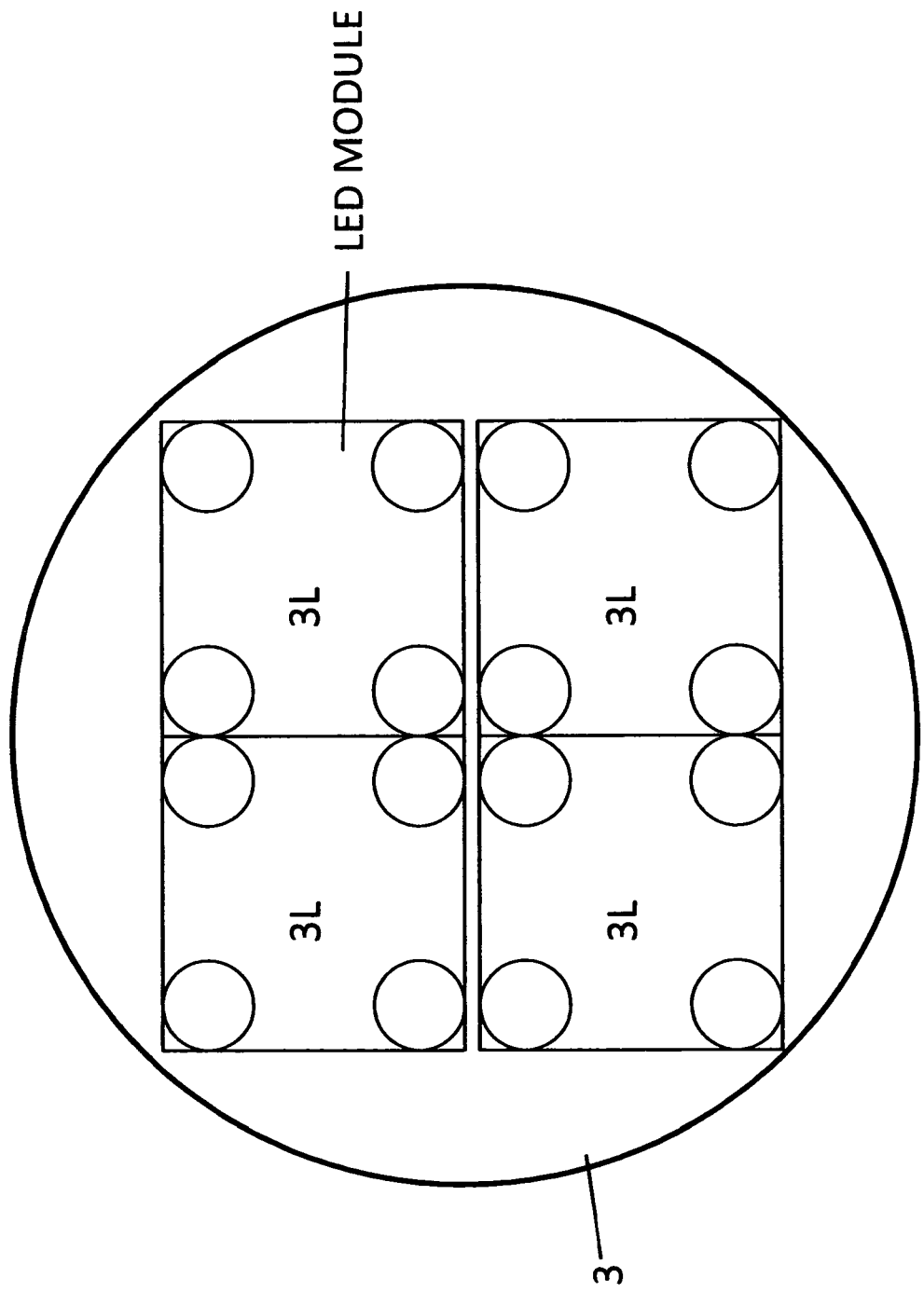
FIG. 10 is a diagrammatic illustration of an example of a support 3 with LED components or modules 3L supported thereon.

Shown in FIG. 10 is an example of a preferred embodiment support 3 section and LED modules 3L. More specifically, conventional LED modules 3L are shown. The modules may be connected to the battery 13 in a conventional manner. Any variety or type of LED may be used without departing from the scope of the invention.

Figure 11:
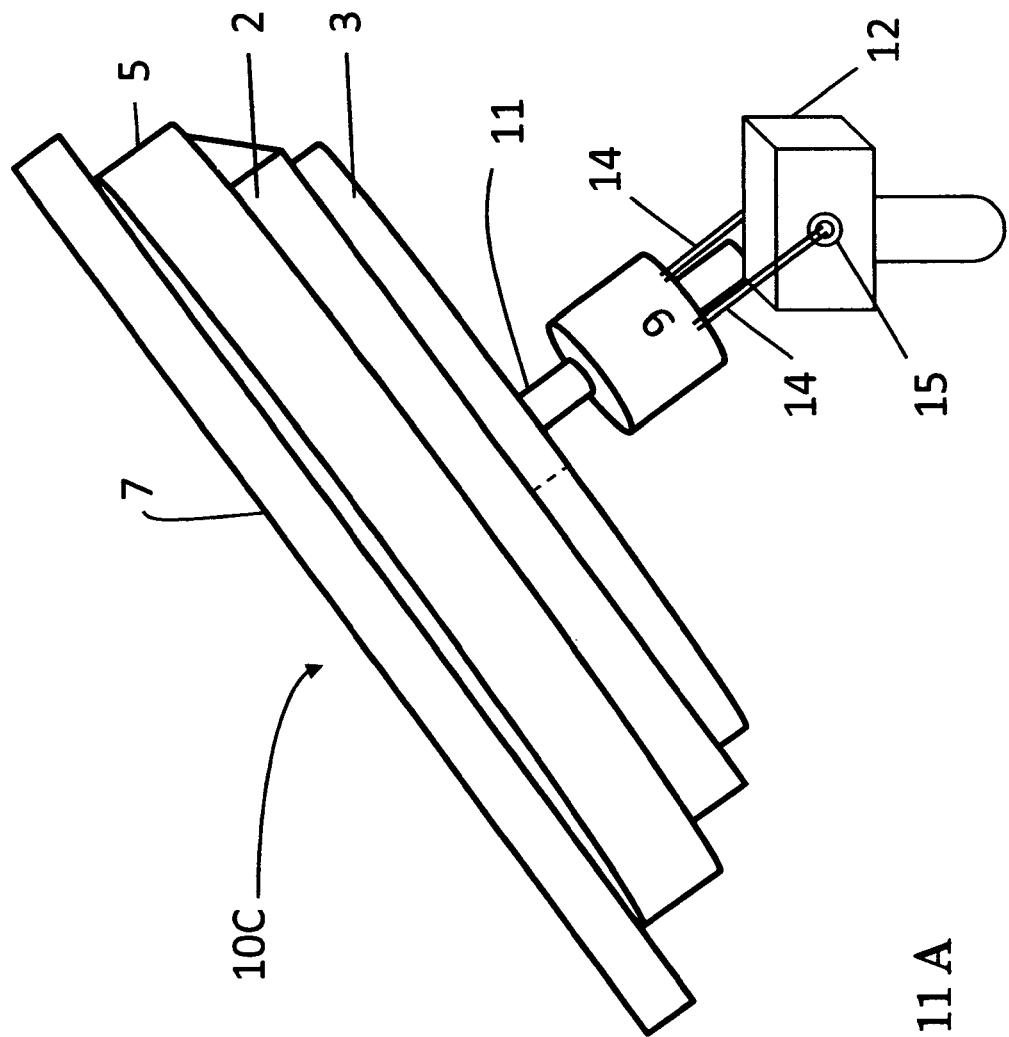
FIG. 11A is a side view illustration of the preferred embodiment of FIG. 1 which has the optional capability of tilting at an angle to gain maximum exposure to the sun.
FIG. 11B is a diagrammatic illustration of a housing 12 comprising a motor 16, two pulleys 16P and 15P upon which a belt drive 17 operates to turn shaft 15. A timer 18 controls the operation as is well know to those of ordinary skill in the art.
Figure 11:
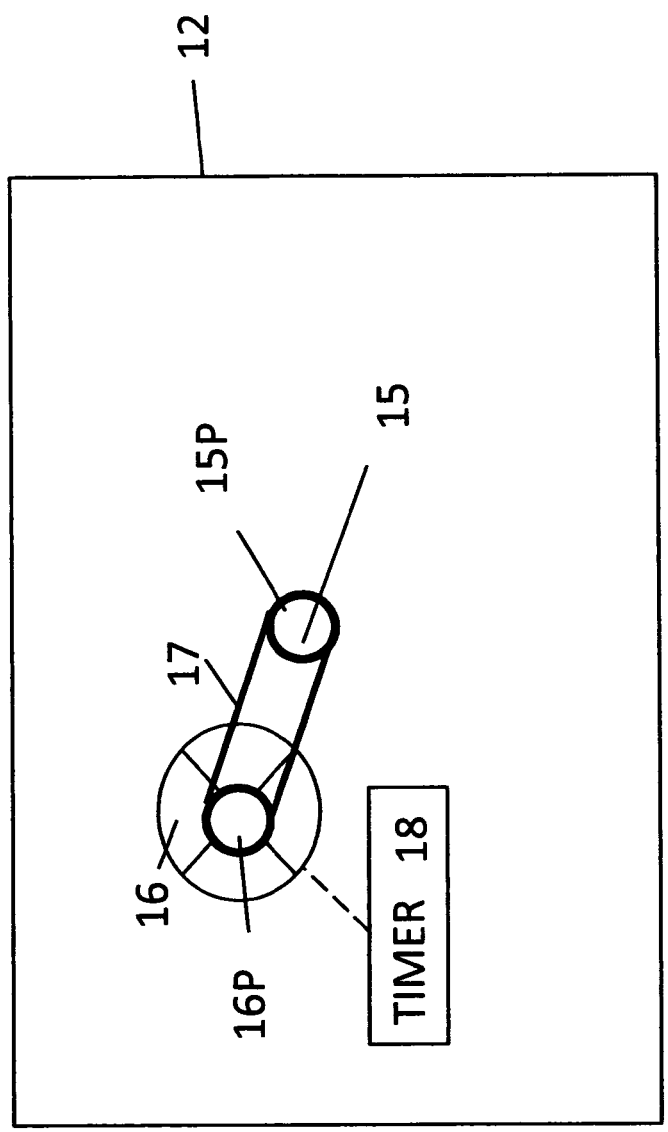

FIG. 11 is a schematic side view of a preferred embodiment of the present invention in which assembly 10C comprises support 3, solar panels 2, cover 5, and wind direction vane 7. Motor-generator 9 is pivotally mounted by supports 14. Each of supports 14 are attached to a pivot or shaft or pivot 15. Shaft or pivot 15 is in turn driven by a motor (shown in FIG. 11B) inside housing 12 which causes the entire assembly 10C to pivot as shown in FIG. 11. As a result the solar support 2 and elements 2S on the assembly 10C can track the sun as it rises in the east and sets in the west. For example, a motor 16 slowly turns the pulley which drives the belt resulting in the angular disposition of the elements 2S.

FIG. 11B is a schematic showing the inside of housing 12, which may for example comprise a motor 16, timer 18 and belt 17 which drives a pulley 15P mounted on shaft 15 to drive the pivoting of the subassembly shown in FIG. 11. Timer 18 is set so that the solar cells 2S will face in a predetermined direction at a predetermined time in order to maximize the sunlight or environmental light on the solar panels, elements, or diodes 2S. The timer 18 activates the motor 16 which drives belt 17 to drive pulley 15P on pivot or shaft 15 that causes the entire assembly 10 to pivot. As a result the solar elements 2S on the assembly 10 can track the sun as it rises in the east and sets in the west.

FIG. 12 is an illustration of an alternate solar panel assembly 2SA comprising a positive grid, N-type layer, active section, P-type layer and metal electrode. The solar element is connected to the circuit 20 and battery 13 as described herein.

Figure 13:
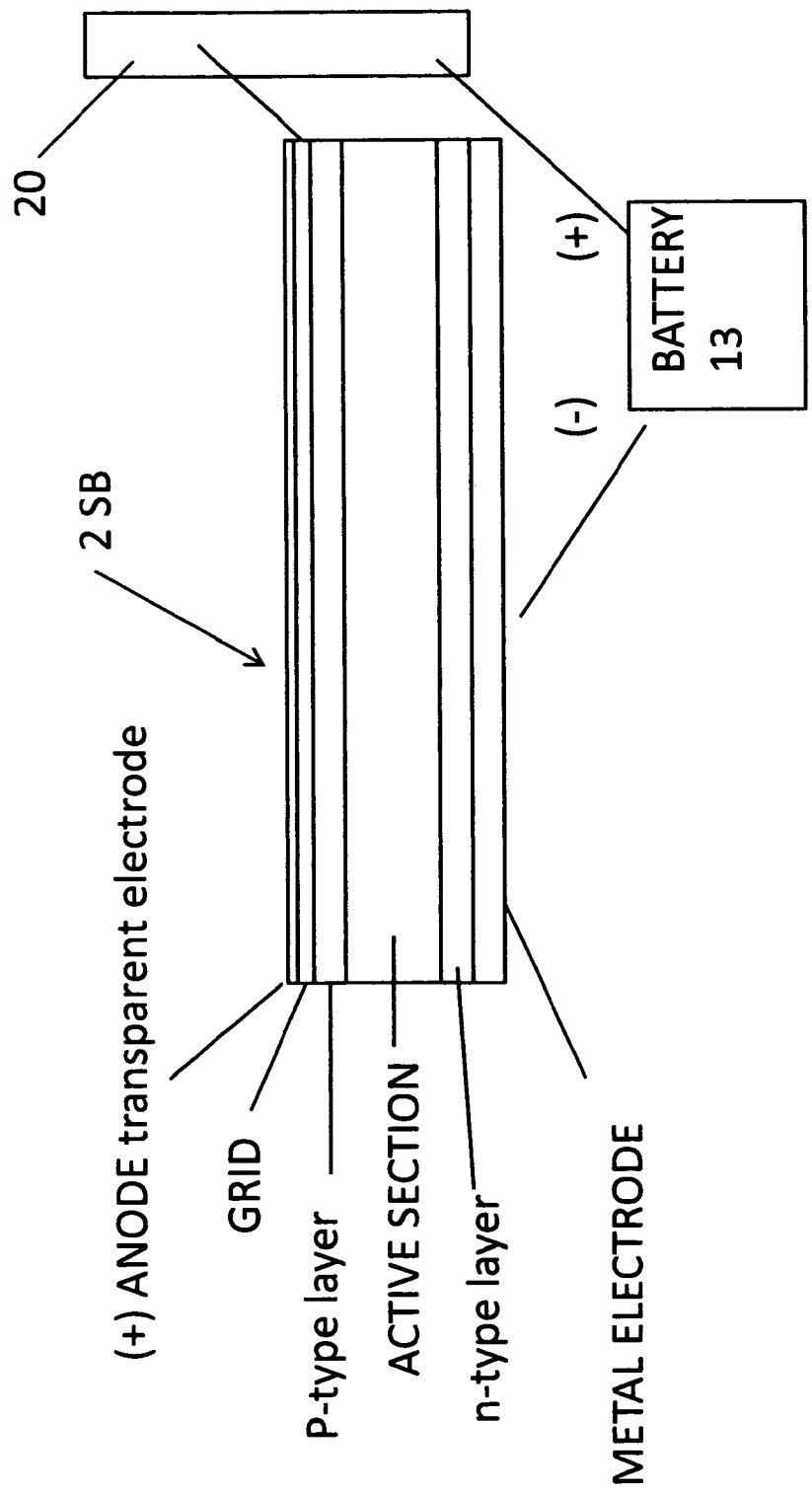
FIG. 13 is an illustration of an alternate solar panel assembly comprising N-type and P-type semiconductor layers separated by a junction to form a solar diode assembly.

FIG. 13 is an illustration of an alternate solar panel assembly 2SB comprising a negative grid, P-type layer, active section, n-type layer and metal electrode. The solar element is connected to the circuit 20 and battery 13 as described herein.

Figure 14:
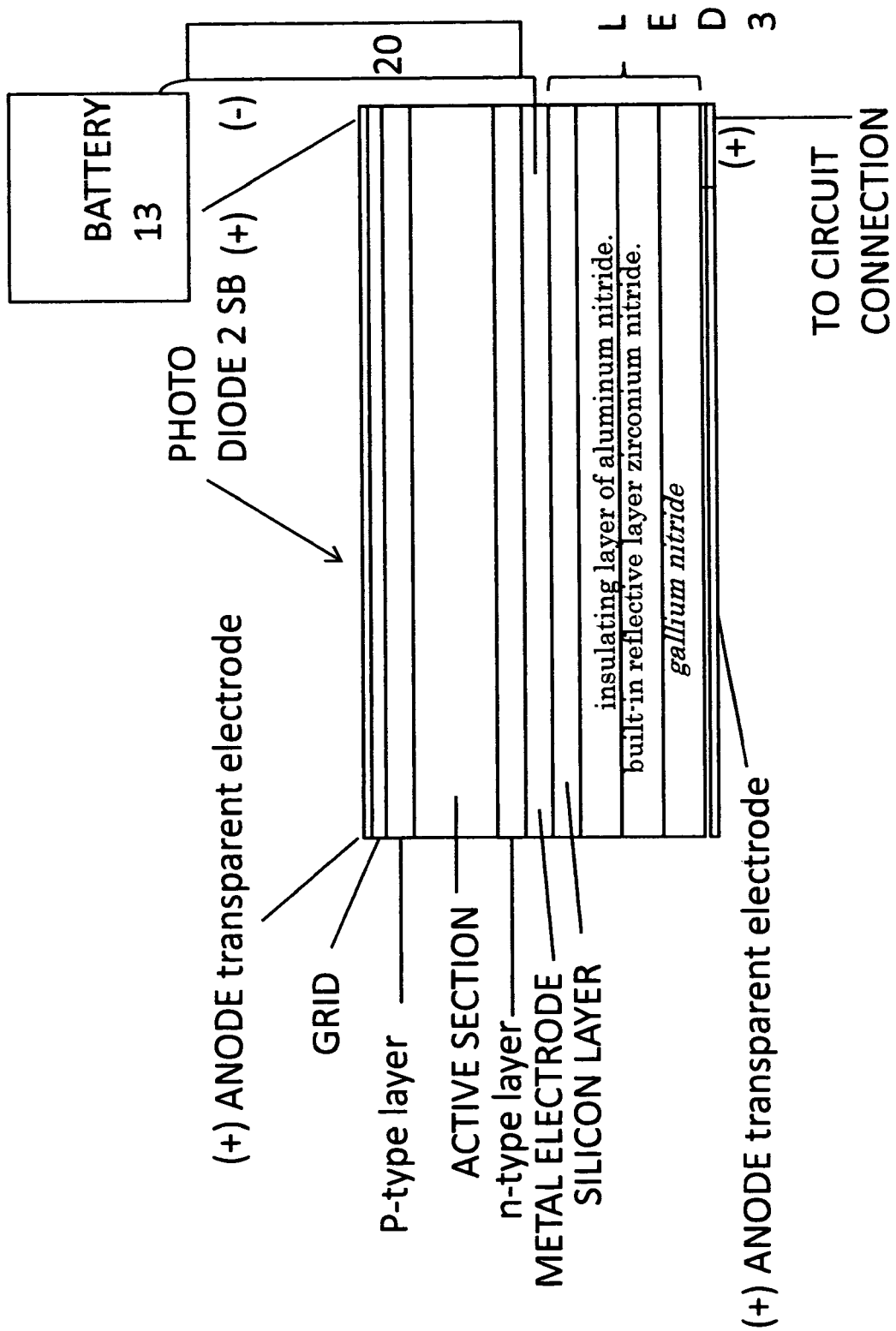
FIG. 14 is a schematic illustration of an optional embodiment in which the LED and solar cell are integral. This optional embodiment may utilize a single substrate for both the solar diode and LED structures whereby the semiconductor layers for the LED and solar diode are fabricated on the opposite sides of the substate by a process such as epitaxy or molecular beam epitaxy, and wherein the LED and solar diode form an integral structure.

FIG. 14 is a schematic illustration of an optional embodiment in which the LED and solar cell are integrally formed or combined after manufacture. Specifically, shown in FIG. 14 is a top anode or transparent electrode. Shown next is a grid, P-type layer, active section, N-type layer, metal electrode (cathode), silicon layer, insulating layer of aluminum nitride, built-in reflective layer of zirconium nitride, and gallium nitride. Schematically shown in FIG. 14 is circuit subassembly 20 and battery 13.

Figure 15:
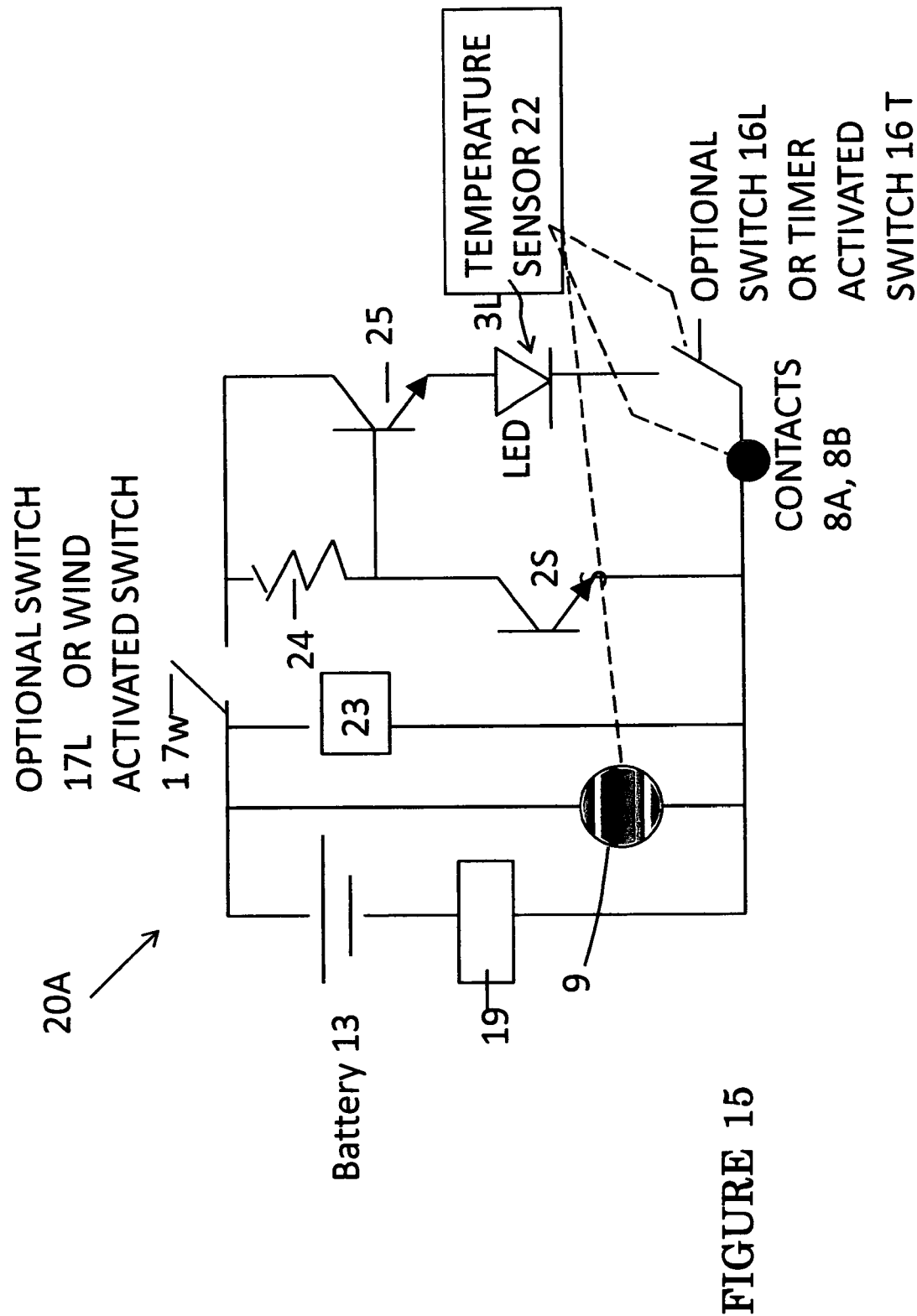
FIG. 15 is a schematic circuit 20 diagram of a preferred embodiment of the present invention.

FIG. 15 is a schematic diagram showing a device 19 for regulating the voltage, controlling the charge into, and/or current from the battery 13 which also may optionally function as an on/off switch which prevents overcharging of the battery 13 and/or effectively removes battery 13 from the circuit 20A. Motor generator 9 operates to recharge battery 13 when in the generator mode and when a low battery indicator 23 indicates the need for a charge. The motor/generator 9 is optional in that the solar diodes may optionally be the sole means for recharging the battery 13. Also, when the motor/generator 9 is operating in the circuit 20A, in cases where the wind is causing the rotation of the vanes 6, the battery may be bypassed using device 19 to disconnect the battery from the circuitry entirely. Similarly, a device 19A may optionally be position in series with the motor/generator 9 to disconnect it from the circuitry when desired. As a further option, devices 19 and 19A may be combined into a combined voltage regulator, charge controller and/or charge level indicator. When the battery is determined to be low, (from optional low battery indicator 23 or the function could be incorporated into the power controller/regulator 19) the contacts 8A, 8B may be positioned such that the contacts are only intermittently connected to create a strobe-like effect for the activation of the LEDs 3L. Similarly, temperature sensor 22 may be operatively connected to the contacts 8A, 8B shorten the contact duration through contacts 8A, 8B or optionally may operate to open the optional switch 16L to prevent over heating of the LEDs 3L, and/˜or activate motor/generator 9 to rotate the support 3 to create a cooling effect. Moreover, alternatively the light detector 25 (such as commonly used part 2N3904) may operate to turns the LEDs on and off at daylight and dusk either by sensing the intensity of light from the sun and/or environment or by a timer which turns the LED on and off at specified times and also be responsive to the temperature sensor.

Figure 16:
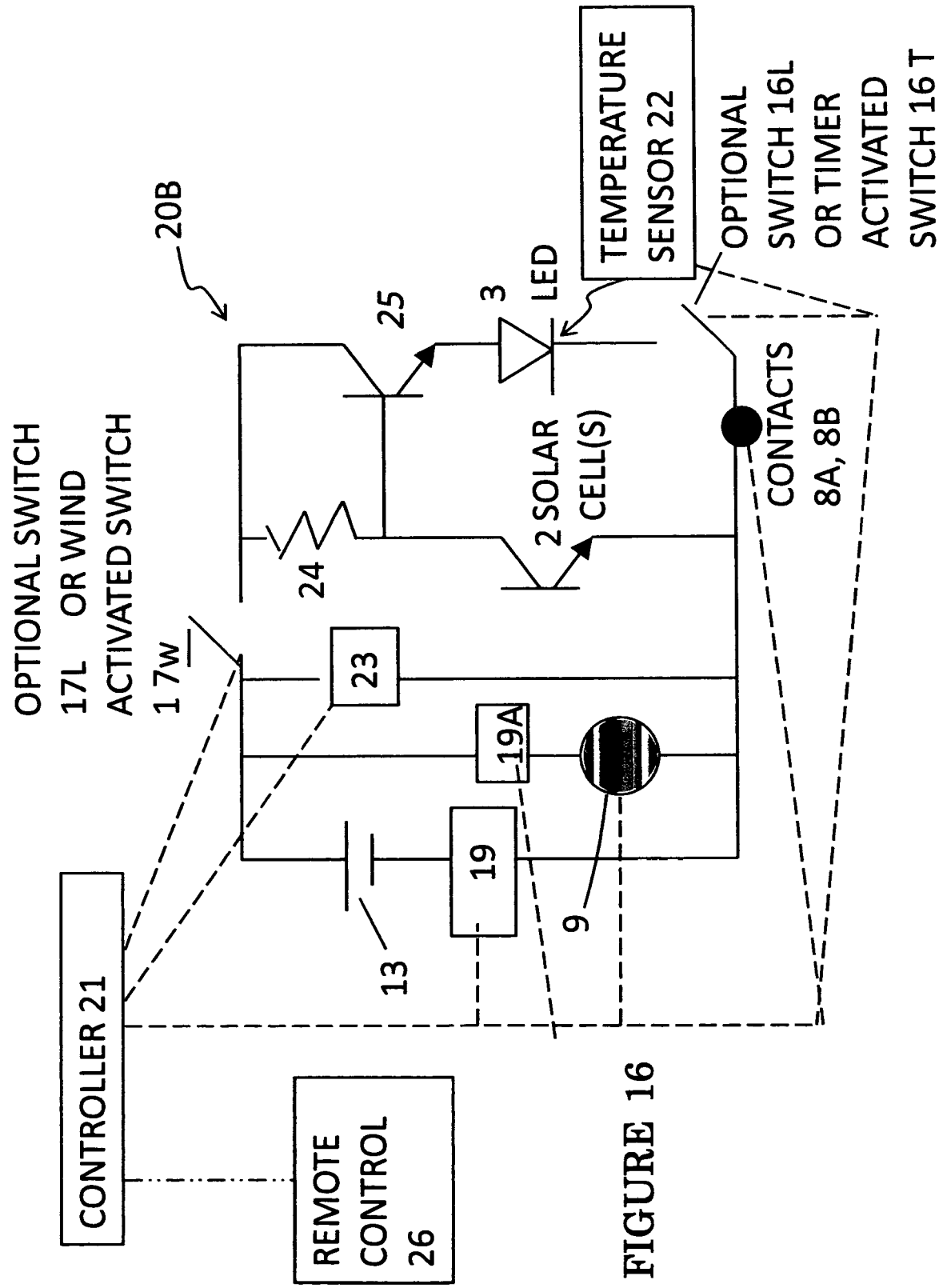
FIG. 16 is a schematic circuit 20A diagram showing the optional controller with control lines represented by dashed lines.

FIG. 16 is a schematic diagram showing circuitry 20B comprising an optional controller 21, with control lines represented by dashed lines. Controller 21 may be a microprocessor, programmable controller, processor, programmable chip device, computer, microcomputer, controller or the like. Controller 21 may receive control signals from the low battery indicator 23 and, in turn, regulate the contacts 8A, 8B such that the contacts are only intermittently connected to create a strobe-like effect for the activation of LEDs 3L. Similarly, if temperature sensor 22 sends a high temperature control signal to the controller 21, controller 21 may send control signals via the control lines to any one of or in tandem open the optional switch 16L to prevent over heating of the LED, activate motor/generator 9 to rotate the support 3 to create a cooling effect, and/˜or shorten the contact duration through contacts 8A, 8B. Moreover, alternatively controller 21 may have a light detector which turns the LED on and off at daylight and dusk either by sensing the intensity of light from the sun and/or environment or by a timer which turns the LED on and off at specified times. Moreover the controller 21 may be a programmable controller includes a feedback routine for measuring the intensities of the LEDs 3L and using the actual intensities as feedback. Optionally, the controller may cause the LEDs 3L to be supplied with approximately 50% of said maximum current capacity or some fraction thereof to either conserve power or reduce the temperature of the LEDs. Optionally, the programmable controller may operate to adjust the intensity, with the programmable controller including an intensity compensation routine for adjusting the intensity of the LED, based on the intensity as detected by feedback means.

Figure 17:
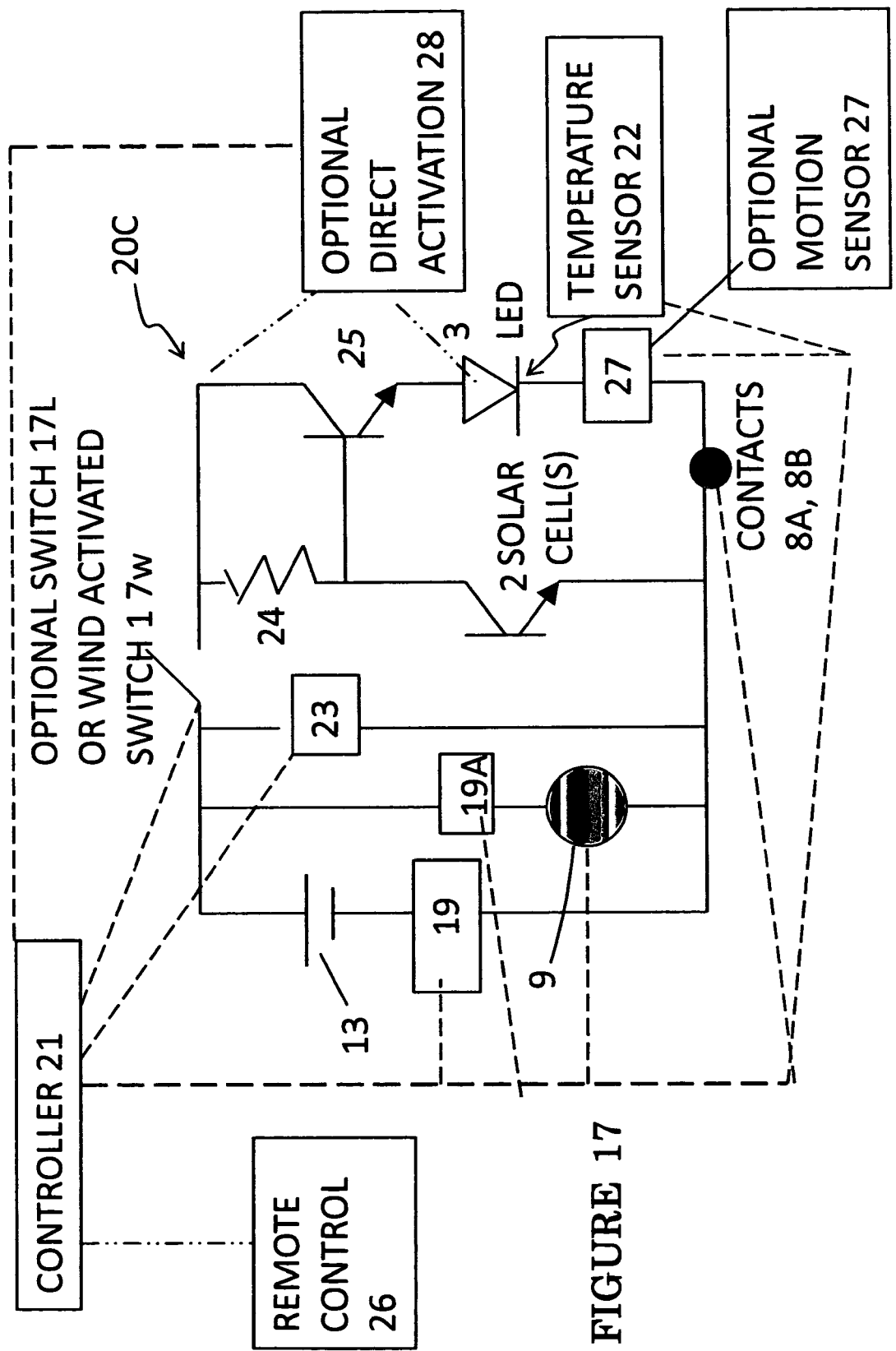
FIG. 17 is a schematic circuit 20B showing the optional controller with control lines represented by dashed lines, remote control and bypass circuitry.
Figure 18:
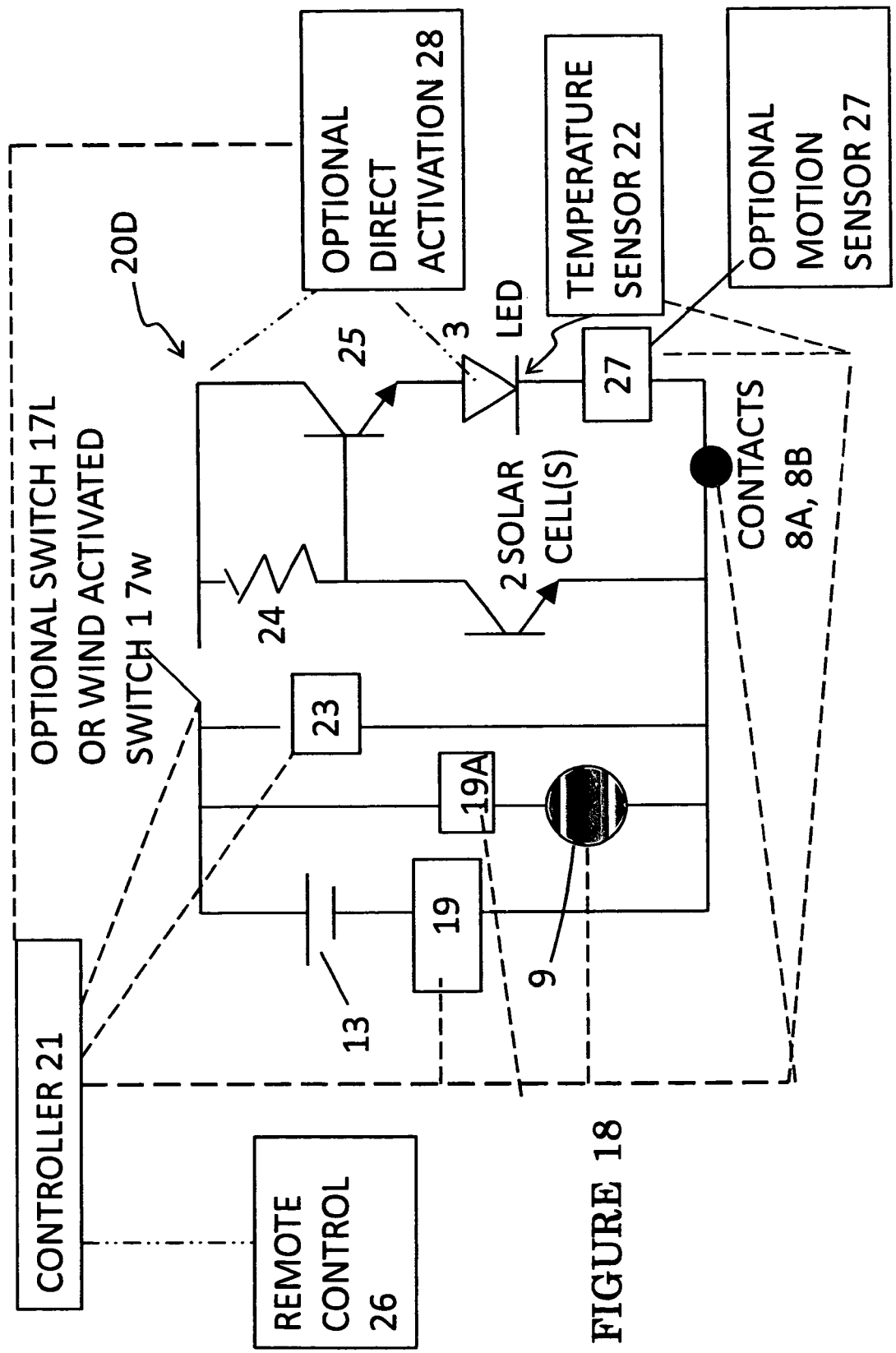
FIG. 18 is a diagrammatic illustration of a light detector subassembly circuit. When there is no light falling on the sensor, the relay closes. The closing of the relay may activate the LED circuitry.

FIG. 17 is a schematic diagram showing the circuitry of a preferred embodiment assembly 20C comprising an optional controller 21 with control lines being represented by dashed lines illustrating the sending of control signals and receiving of data signals. These control lines may be wired or connect wirelessly such as for example, by Bluetooth technology. The circuit assembly 20 C may further comprise an optional remote control and bypass circuitry. Shown in FIG. 17 is a controller 21 which is optionally controlled by a remote control 26. Controller 21, which is optionally programmable, controls switch 17 which causes the motor/generator 9 and battery 13 to become connected to the solar cell and LEDs 3L. Controller 21 may operate to select one of the motor or generator to rotate the support 3 using the motor mode of motor/generator 9 or select the generator mode in order for the rotation of the support 3 to be used to generate electricity in the generator mode of motor/generator 9. Optionally, the extent of the battery charge may trigger the mode of the motor/generator 9. Such as, for example, if the battery is low, and the wind is causing the support 3 to turn, power from the rotation can be used to generate electricity to power to LEDs 3L or for storage into battery 13. Controller 21 is linked by control lines to the low battery indicator 23. If a low battery is sensed and the solar cells are not in the process of recharging the battery (such as for example, during nighttime), the controller, which includes a day/night photosensor, may either disconnect the battery from the LED circuitry or cause the LEDs to flash intermittently through contacts 8A, 8B in strobe-like fashion to conserve power.

Inasmuch as controller 21 is also optionally connected by control lines to motor/generator 9, if the operator who operates the remote control 26 decides that a turning of the support 3 is beneficial to cause rotation of the LEDs 3L, then the operator turns the motor 9 on via the remote control. Similarly, the control lines are connected to an optional direct activation circuit which bypasses the photoelectric light detector 25 and turns on the LEDs 3L for purposes of testing or daylight operation. Optionally, a motion senor 27 may be used to activate the LEDs 3L when motion is sensed by the motion sensor 27. Controller 21 may optionally be connected to the motion sensor 27 to deactivate the motion sensor 27 through either programming or through operator activation via the remote control 26.

As depicted in FIG. 17, an optional controller 19 which may be or include a voltage regulator/charge control that optionally functions as a switch to effectively regulate the charging of the battery 13, regulate the voltage/current or electrical power being sent to and/or from the battery 13 and/or disconnect the battery 13 from the remaining circuitry. For example, if wind power is driving the wind vanes and producing electric power via the motor/generator 9 and the battery is not in need of a charge, the controller 19 may receive control signals from the controller 21 which effectively opens a switch within controller 19 to remove the battery 13 from the remainder of circuit 20. If the wind power is available, but either the LEDs 3L are nonoperational or power is in excess of that needed to power the LEDs, then the controller 21 in conjunction with the controller 19 may cause the current generated by the motor/generator 9 to charge the battery 13.

Controller 21 may be optionally connected to the motor generator 9. Control signals may be used to set the motor/generator into either the motor mode, which operates to turn the support 3 or in the generator mode whereby rotation of the support 3 drives the generator 9. Controller 21 may be connected to sense the motion of the support 3 to determine if the wind is driving the turbine blades 6 so that power from the generator 9 may be used to either recharge the battery or power the LEDs.

Controller 21 may also connected via control lines to temperature sensor 22. Should the temperature being sensed exceed a predetermined temperature above which the circuitry or LEDs 3L or solar elements 2S may be damaged or effected by to much heat, the controller may (1) turn off the LEDs, (2) intermittently activate the LEDs and/or (3) cause the motor 9 to rotate support 3 effectively operating as a fan to cool down the LEDs 3L.

FIG. 5A is an overhead illustration of a cut-away view of support 3 including LED panels 3A. FIG. 5A illustrates optional vanes 6A which can be used to propel rotation of the support 3 and provide an additional cooling effect. Optionally, cover 5 may cover one half the circumference of vanes 6A so that the wind imparts only vanes turning in the direction of the wind. With the vanes placed in the proximity of the LEDs 3L, the cooling effect is enhanced. With the optional embodiment shown in FIG. 5A, the vanes may be placed in the proximity of the LEDs 3L to enhance the cooling effect. The LEDs 3L shown in FIG. 5A are merely illustrative as to a potential location of 3 LEDs 3L are exemplary and not limiting. The light from the LEDs 3L as shown is reflected by the mirrored surfaces of the wind vanes 6A to either scatter or intensify the light depending upon the nature of the application, environment and purpose of the light. For example, the mirrored vanes may provide a decorative effect or may be used to increase coverage of the light being emitted from the LEDs 3L.

Controller 21 may optionally be programmed to turn on and off certain of the LEDs 3L at either specific times or in a specific sequence. Optionally, the LEDs may vary in color and the controller 21 may be used to vary the colors and/or the sequence of colors. This may be programmable and/or operator activated through remote control 25. Moreover, in conjunction with the motion activated circuitry or motion sensor 27, the LEDs may flash red, for example, when an intruder is sensed. Thus, the device is operable as a security system. Optionally, an alarm may be activated upon the sensing of motion. The controller may optionally be used to select a security mode or the remote control may be used by the operator to select a security mode.

Controller 21 is also connected by control lines (shown in FIGS. 16 and 17 by dashed lines) to a controller 19A which optionally may include voltage regulator or charge control functions. Controller 19A may optionally include a switch which effectively removes the motor generator 9 from the circuit 20. For example, in extreme wind conditions, it may be desirable to remove the generator completely from the circuitry.

The terminology controller as used herein may be a microprocessor, computer, programmable controller, programmable chip, processor or the like. The terminology motor/generator as used herein means a combination motor/generator or, in the alternative, a motor operatively connected to a generator. The motor/generator having a motor mode when it is used to turn a shaft and a generator mode in which a turning shaft generates electrical power.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An assembly comprising:
    at least one electrical lighting device; the at least one electrical lighting device being mounted to at least one support;
    at least one movable solar element for creating electric power from solar power movably positioned so as to increase exposure to sunlight by movement so as to enhance the creation of electrical power by the solar element;
    at least energy storage element for storing electricity generated by the solar element;
    at least one wind impacting surface operatively associated with the at least one support, the at least one electrical lighting device and the at least one movable solar element so as to move therewith;
    at least one energy converter for generating electric power from the at least one wind impacting surface; and
    at least one shaft operatively connected to the at least one energy converter and the at least one support;
    the at least one energy converter being operatively connected to the at least one energy storage element for storing electric power therein;
    wherein the at least one movable solar element is movably positioned so as to increase exposure to the sun.

2. The assembly of claim 1 wherein the at least one energy converter comprises a generator.

3. An assembly comprising:
    at least one electrical lighting device; the at least one electrical lighting device being mounted to at least one support;
    at least one movable solar element for creating electric power from solar power movably positioned so as to increase exposure to sunlight by movement so as to enhance the creation of electrical power by the solar element;
    at least energy storage element for storing electricity generated by the solar element;
    at least one wind impacting surface operatively associated with the at least one support, the at least one electrical lighting device and the at least one movable solar element so as to move therewith;

at least one energy converter for generating electric power from the at least one wind impacting surface; and at least one shaft operatively connected to the at least one energy converter and the at least one support;

the at least one energy converter being operatively connected to the at least one energy storage element for storing electric power therein;

wherein the at least one movable solar element is movably positioned so as to increase exposure to the sun; and wherein the at least one wind impacting surface comprises a plurality of wind vanes operatively associated with the at least one support to form a wind turbine; the at least one support being operatively associated with the shaft; the at least one shaft being operatively associated with the at least one energy converter, such that when the energy converter is in a first mode, the wind causes the wind impacting surface to move and the energy converter operates to generate electricity, and when the energy converter is in a second mode, the energy converter causes rotation of the at least one support to rotate the at least one electrical device.

4. An assembly comprising:

at least one electrical lighting device; the at least one electrical lighting device being mounted to at least one support;

at least one movable solar element for creating electric power from solar power movably positioned so as to increase exposure to sunlight by movement so as to enhance the creation of electrical power by the solar element;

at least energy storage element for storing electricity generated by the solar element;

at least one wind impacting surface operatively associated with the at least one support, the at least one electrical lighting device and the at least one movable solar element so as to move therewith;

at least one energy converter for generating electric power from the at least one wind impacting surface; and at least one shaft operatively connected to the at least one energy converter and the at least one support;

the at least one energy converter being operatively connected to the at least one energy storage element for storing electric power therein;

wherein the at least one movable solar element is movably positioned so as to increase exposure to the sun; and wherein the at least one energy converter comprises a motor which rotates the support.

5. The assembly of claim 1 further comprising at least one strobe element which causes the at least one electrical device to turn on and off.

6. The assembly of claim 5 wherein the strobe element is operatively associated with the shaft; whereby as the shaft rotates the strobe element makes contact intermittently causing intermittent operation of the at least one electrical device.

7. The assembly of claim 1 further comprising a cover operatively associated with the at least one support and a wind direction detector operatively associated with the cover causing the cover to turn when the wind changes direction; and wherein the at least one wind impacting surface comprises a plurality of wind vanes operatively associated with the at least one support to cause rotation thereof; and wherein the wind causes the support to rotate, the cover covers the wind vanes for which the force of the wind is in a direction opposite to the rotation of the vanes.

8. The assembly of claim 1 further comprising a controller for controlling the energy converter for selectively changing the energy converter from a first mode as a generator to a second mode as a motor.

9. The assembly of claim 1 further comprising a temperature sensor and wherein the energy converter operates in a first mode when the wind is causing the at least one support to turn and operates in a second mode in response to the temperature sensor to generate air flow to cool the assembly.

10. The assembly of claim 1 further comprising an ambient light condition detector and wherein the at least one electrical device is activated by an ambient light condition detector.

11. An assembly comprising:

at least one electrical device; the at least one electrical device being operatively connected to at least one support;

at least one movable solar element for creating electric power from solar power;

at least energy storage element for storing electricity generated by the solar element;

at least one wind impacting surface operatively associated with the at least one support and in proximity to the at least one electrical device;

at least one energy converter for generating electric power from the at least one wind impacting surface; and at least one shaft operatively connected to the at least one energy converter and the at least one support;

the at least one energy converter being operatively connected to the at least one energy storage element for storing electric power therein;

wherein the at least one movable solar element is movably positioned so as to increase exposure to the sun and wherein the electrical device comprises an LED and further comprising a light detector; the light detector controlling the operation of the LED.

12. An assembly comprising:

at least one electrical device; the at least one electrical device being operatively connected to at least one support;

at least one movable solar element for creating electric power from solar power;

at least energy storage element for storing electricity generated by the solar element;

at least one wind impacting surface operatively associated with the at least one support;

at least one energy converter for generating electric power from the at least one wind impacting surface; and at least one shaft operatively connected to the at least one energy converter and the at least one support;

the at least one energy converter being operatively connected to the at least one energy storage element for storing electric power therein;

wherein the at least one energy converter comprises at least one generator and wherein the at least one support is operatively associated with a rotatable element for rotation thereon; and wherein the at least one wind impacting surface comprises a plurality of wind vanes operatively associated therewith which cause the support to rotate and causes the rotatable element to rotate which causes the at least one energy converter to generate electric power.

13. An assembly comprising:

at least one electrical device; the at least one electrical device being operatively connected to at least one support;

at least one movable solar element for creating electric power from solar power;

at least energy storage element for storing electricity generated by the solar element;

at least one wind impacting surface operatively associated with the at least one support;

at least one energy converter for generating electric power from the at least one wind impacting surface; and at least one shaft operatively connected to the at least one energy converter and the at least one support;

the at least one energy converter being operatively connected to the at least one energy storage element for storing electric power therein;

wherein the at least one solar element and the at least one support are supported by the shaft; the shaft being pivotally mounted to a pivot which is driven by a motor, whereby through the operation of the motor the solar element is positioned to absorb sunlight from the sun as the sun rises and sets.

14. The assembly of claim 13 further comprising a controller which is programmable which controls the operation of the motors.

15. An assembly comprising:

at least one LED device, the at least one LED device being operatively associated with at least one support;

at least one solar element for creating electric power from solar power; the at least one solar element being movably mounted;

at least one energy storage device for storing electricity generated by the solar element;

at least one energy converter operatively associated with the at least one storage device; and at least one shaft operatively connected to the at least one energy converter and the support; the at least one energy converter operating to rotate the support;

the at least one wind impacting surface operatively associated with the at least one support; the at least one wind impacting surface operative to move in response to wind;

wherein the LED rotates when the at least one solar element rotates.

16. The assembly of claim 15 wherein the at least one solar element is controlled by a timing device.

17. The assembly of claim 15 wherein the assembly further comprises a motor.

18. The assembly of claim 15 wherein the energy converter comprises a motor that rotates the at least one wind impacting surface.

19. The assembly of claim 15 wherein the at least one wind impacting surface comprises a plurality of wind vanes operatively associated with the support; the at least one shaft being operatively associated with the at least one energy converter such that the wind causes the wind impacting surface to move; and wherein the energy converter operates to move the at least one shaft and wind impacting surface when the wind is not present.

* * * * *